US012657469B2

(12) United States Patent
Xuan et al.

(10) Patent No.: US 12,657,469 B2
(45) Date of Patent: Jun. 16, 2026

(54) TRAINING MACHINE-TRAINED MODELS BY DIRECTLY SPECIFYING GRADIENT ELEMENTS

(71) Applicant: Microsoft Technology Licensing, LLC, Redmond, WA (US)

(72) Inventors: Hong Xuan, Bellevue, WA (US); Xi Chen, Bellevue, WA (US); Saurajit Mukherjee, Kirkland, WA (US); Li Huang, Sammamish, WA (US); Kun Wu, Bellevue, WA (US); Arun Kumar Sacheti, Sammamish, WA (US); Kamal Ginotra, Kirkland, WA (US); Meenaz Aliraza Merchant, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1066 days.

(21) Appl. No.: 17/740,383

(22) Filed: May 10, 2022

(65) Prior Publication Data

US 2023/0368031 A1 Nov. 16, 2023

(51) Int. Cl.
*G06N 3/084* (2023.01)
*G06N 3/045* (2023.01)

(52) U.S. Cl.
CPC ............. *G06N 3/084* (2013.01); *G06N 3/045* (2023.01)

(58) Field of Classification Search
CPC ....... G06N 3/084; G06N 3/045; G06N 3/0464
See application file for complete search history.

(56) References Cited

U.S. PATENT DOCUMENTS

| | | | |
|---|---|---|---|
| 2015/0278200 A1 | 10/2015 | He et al. | |
| 2020/0250476 A1* | 8/2020 | Sather | G06V 10/764 |
| 2020/0302340 A1* | 9/2020 | Durand | G06N 3/045 |
| 2022/0036127 A1* | 2/2022 | Lin | G06T 11/00 |
| 2022/0138252 A1* | 5/2022 | Hsiao | G06F 16/583 |
| | | | 707/722 |

OTHER PUBLICATIONS

Wu, Yiling, et al. "Learning fragment self-attention embeddings for image-text matching." Proceedings of the 27th ACM international conference on multimedia. 2019. (Year: 2019).*

(Continued)

*Primary Examiner* — Matthew Ell
*Assistant Examiner* — Humaira Zahin Mauni

(57) ABSTRACT

A computer-implemented technique performs machine learning that bypasses the traditional design of loss functions. The technique includes receiving plural instances of gradient objective information. Each of the plural instances includes a particular combination of plural gradient elements. The technique produces plural sets of machine-trained parameter values using the plural respective instances of gradient objective information. The technique performs this operation based on the plural instances of gradient objective information as given, without calculating the plural instances of gradient objective information using loss functions. The technique then measures performance of the plural sets of machine-trained parameter values in an application system. Based on the measured performance, the technique provides output information that identifies a particular set of machine-trained parameter values that satisfies a prescribed test.

20 Claims, 9 Drawing Sheets

(56) References Cited

OTHER PUBLICATIONS

Engilberge, Martin. Deep Inside Visual-Semantic Embeddings. Diss. Sorbonne Universite, 2020. (Year: 2020).*

Wang, Guangzhi. "Dynamic knowledge distillation with cross-modality knowledge transfer." Proceedings of the 29th ACM International Conference on Multimedia. 2021. (Year: 2021).*

He, et al., "Deep Residual Learning for Image Recognition," Open Access version of paper in 2016 IEEE Conference on Computer Vision and Pattern Recognition (CVPR), 2016, 9 pages.

Hochreiter, et al., "Long Short-Term Memory," in Neural Computation, vol. 9, Issue 8, Nov. 1997, 32 pages.

Hoffer, et al., "Deep metric learning using Triplet network," arXiv, Cornell University, arXiv:1412.6622v4 [cs.LG], Dec. 4, 2018, 8 pages.

Huang, et al., "Learning Semantic Concepts and Order for Image and Sentence Matching," Open Access version of paper in IEEE Transactions on Pattern Analysis and Machine Intelligence, vol. 42, No. 3, Mar. 2020, 9 pages.

Kiros, et al., "Unifying Visual-Semantic Embeddings with Multimodal Neural Language Models," arXiv, Cornell University, arXiv:1411.2539v1 [cs.LG], Nov. 10, 2014, 13 pages.

Krause, et al., "3D Object Representations for Fine-Grained Categorization," in ICCVW '13: Proceedings of the 2013 EEE International Conference on Computer Vision Workshops, Dec. 2013, 8 pages.

Lee, et al., "Stacked Cross Attention for Image-Text Matching," arXiv, Cornell University, arXiv:1803.08024v1 [cs.CV, Mar. 21, 2018, 23 pages.

Li, et al., "Align before Fuse: Vision and Language Representation Learning with Momentum Distillation," in 35th Conference on Neural Information Processing Systems (NeurIPS 2021), 2021, 12 pages.

Li, et al., "Visual Semantic Reasoning for Image-Text Matching," Open Access version of paper in 2019 IEEE/CVF International Conference on Computer Vision (ICCV), 2019, 9 pages.

Li, et al., "Oscar: Object-Semantics Aligned Pre-training for Vision-Language Tasks," arXiv, Cornell University, arXiv:2004.06165v5 [cs.CV], Jul. 26, 2020, 21 pages.

Liu, et al., "ROBERTa: A Robustly Optimized BERT Pretraining Approach," arXiv:1907.11692v1 [cs.CL], Jul. 26, 2019, 13 pages.

Liu, et al., "DeepFashion: Powering Robust Clothes Recognition and Retrieval with Rich Annotations," Open Access version of paper in 2016 IEEE Conference on Computer Vision and Pattern Recognition (CVPR), 2016, Jun. 2016, 9 pages.

Lu, et al., "VILBERT: Pretraining Task-Agnostic Visiolinguistic Representations for Vision-and-Language Tasks," in 33rd Conference on Neural Information Processing Systems, 2019, 11 pages.

Mahajan, et al., "Exploring the Limits of Weakly Supervised Pretraining," arXiv, Cornell University, arXiv:1805.00932v1 [cs.CV], May 2, 2018, 23 pages.

Paszke, et al., "Automatic differentiation in PyTorch," in 31st Conference on Neural Information Processing Systems (NIPS 2017), 2017, 4 pages.

Schroff, et al., "FaceNet: A Unified Embedding for Face Recognition and Clustering," Open Access version of paper in 2015 IEEE Conference on Computer Vision and Pattern Recognition (CVPR), 2015, 9 pages.

Sohn, Kihyuk, "Improved Deep Metric Learning with Multi-class N-pair Loss Objective," in Advances in Neural Information Processing Systems 29 (NIPS 2016), 2016, 9 pages.

Song, et al., "Deep Metric Learning via Lifted Structured Feature Embedding," Open Access version of paper of 2016 IEEE Conference on Computer Vision and Pattern Recognition (CVPR), 2016, 9 pages.

Sun, et al., "Circle Loss: A Unified Perspective of Pair Similarity Optimization," Open Access version of paper in 2020 IEEE/CVF Conference on Computer Vision and Pattern Recognition (CVPR), 2020, 10 pages.

Tan, et al., "LXMERT: Learning Cross-Modality Encoder Representations from Transformers," arXiv, Cornell University, arXiv:1908.07490v3 [cs.CL], Dec. 3, 2019, 14 pages.

Vaswani, et al., "Attention is All you Need," in Advances in Neural Information Processing Systems 30 (NIPS 2017), 30, 2017, 11 pages.

Anderson, et al., "Bottom-Up and Top-Down Attention for Image Captioning and Visual Question Answering," Open Access version of paper in in 2018 IEEE/CVF Conference on Computer Vision and Pattern Recognition (CVPR), 2018, 10 pages.

Wang, et al., "Multi-Similarity Loss with General Pair Weighting for Deep Metric Learning," Open Access version of paper in 2019 IEEE/CVF Conference on Computer Vision and Pattern Recognition (CVPR), 2019, 9 pages.

Welinder, et al., "Caltech-UCSD Birds 200," Technical Report CNS-TR-2010-001, California Institute of Technology, 2010, 15 pages.

Wu, et al., "Unified Visual-Semantic Embeddings: Bridging Vision and Language with Structured Meaning Representations," Open Access version of paper 2019 IEEE/CVF Conference on Computer Vision and Pattern Recognition (CVPR), 2019, 10 pages.

Xuan, et al., "Hard negative examples are hard, but useful," arXiv, Cornell University, arXiv:2007.12749v2 [cs.CV], Feb. 25, 2021, 20 pages.

Yi, et al., "Deep Metric Learning for Practical Person Re-Identification," arXiv, Cornell University, arXiv:1407.4979v1 [cs.CV], Jul. 18, 2014, 11 pages.

Young, et al., "From image descriptions to visual denotations: New similarity metrics for semantic inference over event descriptions," in Transactions of the Association for Computational Linguistics, 2, 2014, pp. 67-78.

Yu, et al., "Gradient Surgery for Multi-Task Learning," arXiv, Cornell University, arXiv:2001.06782v4 [cs.LG], Dec. 22, 2020, 27 pages.

Zeng, et al., "Multi-Grained Vision Language Pre-Training: Aligning Texts with Visual Concepts," arXiv, Cornell University, arXiv:2111.08276v3 [cs.CL], Jun. 1, 2022, 16 pages.

Zhang, et al., "VinVL: Revisiting Visual Representations in Vision-Language Models," Open Access version of paper in Proceedings of the IEEE/CVF Conference on Computer Vision and Pattern Recognition (CVPR), 2021, 10 pages.

Zhang, et al., "P2SGrad: Refined Gradients for Optimizing Deep Face Models," Open Access version of paper in 2019 IEEE/CVF Conference on Computer Vision and Pattern Recognition (CVPR), 2019, 9 pages.

Xuan, et al., "Dissecting Deep Metric Learning Losses for Image-Text Retrieval," arXiv, Cornel University, arXiv:2210.13188v1 [cs.CV], Oct. 21, 2022, 10 pages.

Xuan, et al., "Dissecting Deep Metric Learning Losses for Image-Text Retrieval," Open Access version of paper in 2023 IEEE/CVF Winter Conference on Applications of Computer Vision (WACV), Jan. 2023, 10 pages.

Xuan, Hong, "GitHub—microsoft/VSE_Gradient," available at https://github.com/microsoft/VSE_Gradient, Dec. 16, 2022, 2 pages.

Xuan, et al., "Dissecting the impact of different loss functions with gradient surgery," arXiv, Cornell University, arXiv:2201.11307v1 [cs.CV], Jan. 27, 2022, 13 pages.

Cao, et al., "Image-text Retrieval: A Survey on Recent Research and Development," arXiv, Cornell University, arXiv:2203.14713v2 [cs.IR], Apr. 28, 2022, 8 pages.

PCT Search Report and Written Opinion for PCTUS2023/013398, date of mailing Jun. 1, 2023, 18 pages.

Wang, et al., "Consensus-Aware Visual-Semantic Embedding for Image-Text Matching," arXiv, Cornell University, arXiv:2007.08883v2 [cs.CV], Feb. 1, 2021, 17 pages.

Chen, et al., "Learning the Best Pooling Strategy for Visual Semantic Embedding," Open Access version of paper in 2021 IEEE/CVF Conference on Computer Vision and Pattern Recognition (CVPR), 2021, 10 pages.

Chen, et al., "Microsoft COCO Captions: Data Collection and Evaluation Server," arXiv, Cornell University, arXiv:1504.00325v2 [cs.CV], Apr. 3, 2015, 7 pages.

(56)            References Cited

OTHER PUBLICATIONS

Chen, et al., "UNITER: UNiversal Image-TExt Representation Learning," in Proceedings of the 16th European Conference on Computer Vision, Aug. 2020, 17 pages.

Devlin, et al., "BERT: Pre-training of Deep Bidirectional Transformers for Language Understanding," in Proceedings of NAACL-HLT 2019, Jun. 2019, pp. 4171-4186.

Dosovitskiy, et al., "An Image is Worth 16x16 Words: Transformers for Image Recognition at Scale," arXiv, Cornell University, arXiv:2010.11929v2 [cs.CV], Jun. 3, 2021, 22 pages.

Faghri, et al., "VSE++: Improving Visual-Semantic Embeddings with Hard Negative," in Proceedings of the British Machine Vision Conference (BMVC), 2018, 13 pages.

Frome, et al., "DeViSE: A Deep Visual-Semantic Embedding Model," in Advances in Neural Information Processing, 2013, 9 pages.

Goldberger, et al., "Neighbourhood Components Analysis," in Advances in Neural Information Processing, 2004,8 pages.

Hadsell, et al., "Dimensionality Reduction by Learning an Invariant Mapping," in 2006 IEEE Computer Society Conference on Computer Vision and Pattern Recognition (CVPR'06), 2006, 8 pages.

Schroff, et al., "FaceNet: A Unified Embedding for Face Recognition and Clustering," in arXiv repository, arXiv:1503.03832v3 [cs.CV], Jun. 17, 2015, 10 pages.

Sohn, Kihyuk, "Improved Deep Metric Learning with Multi-class N-pair Loss Objective," in Proceedings of the 30th Conference on Neural Information Processing Systems (NIPS 2016), 2016, 9 pages.

Sun, et al., "Circle Loss: A Unified Perspective of Pair Similarity Optimization," in arXiv repository, arXiv:2002.10857v2 [cs.CV], Jun. 15, 2020, 10 pages.

Yi, et al., "Deep Metric Learning for Practical Person Re-Identification," in arXiv repository, arXiv:1407.4979v1 [cs.CV], Jul. 18, 2014, 11 pages.

Wang, et al., "Multi-Similarity Loss with General Pair Weighting for Deep Metric Learning," in arXiv repository, arXiv:1904.06627v3 [cs.CV], Mar. 23, 2020, 12 pages.

Goldberger, et al. "Neighbourhood Components Analysis," in Proceeding of Advances in Neural Information Processing Systems 17 (NIPS 2004), 2004, 8 pages.

Dosovitskiy, et al., "An Image is Worth 16×16 Words: Transformers for Image Recognition at Scale," in arXiv repository, arXiv:2010.11929v2 [cs.CV], Jun. 3, 2021, 22 pages.

He, et al., "Deep Residual Learning for Image Recognition," in arXiv repository, arXiv:1512.03385v1 [cs.CV], Dec. 10, 2015, 12 pages.

Vaswani, et al., "Attention is All You Need," in arXiv repository, arXiv:1706.03762v5 [cs.CL], Dec. 6, 2017, 15 pages.

Devlin, et al., "BERT: Pre-training of Deep Bidirectional Transformers for Language Understanding," in arXiv repository, arXiv:1810.04805v2 [cs.CL] May 24, 2019, 16 pages.

"A Gentle Introduction to Torch.Autograd," available at https://pytorch.org/tutorials/beginner/blitz/autograd_tutorial.html, accessed on Apr. 5, 2022, 4 pages.

"Autograd Mechanics," available at https://pytorch.org/docs/stable/notes/autograd.html, accessed on Apr. 5, 2022, 8 pages.

Patel, Jay, "Digging Deeper in Metric Learning with Loss Functions," available at https://towardsdatascience.com/metric-learning-loss-functions-5b67b3da99a5, Towards Data Science, Nov. 12, 2019, 17 pages.

Kumar, Vaibhav, "PyTorch Autograd: Understanding the heart of Pytroch's magic," available at https://towardsdatascience.com/, Towards Data Science, Jan. 7, 2019, 15 pages.

"Losses—PyTorch Metric Learning," available at https://kevinmusgrave.github.io/pytorch-metric-learning/losses/, accessed on Apr. 6, 2022, 31 pages.

"Triplet loss," available at https://en.wikipedia.org/wiki/Triplet_loss, Wikipedia article, accessed on Sep. 16, 2025, 4 pages.

Vishwakarma, Neha, available at read://https_www.analyticsvidhya.com/?url=https%3A%2F%2Fwww.analyticsvidhya.com%2Fblog%2F2023%2F09%2Fwhat-is-adam-optimizer%2F%23h-steps-involved-in-the-adam-optimization-algorithm, "What is Adam Optimizer?," Analytics Vidhya, Apr. 23, 2025, 7 pages.

* cited by examiner

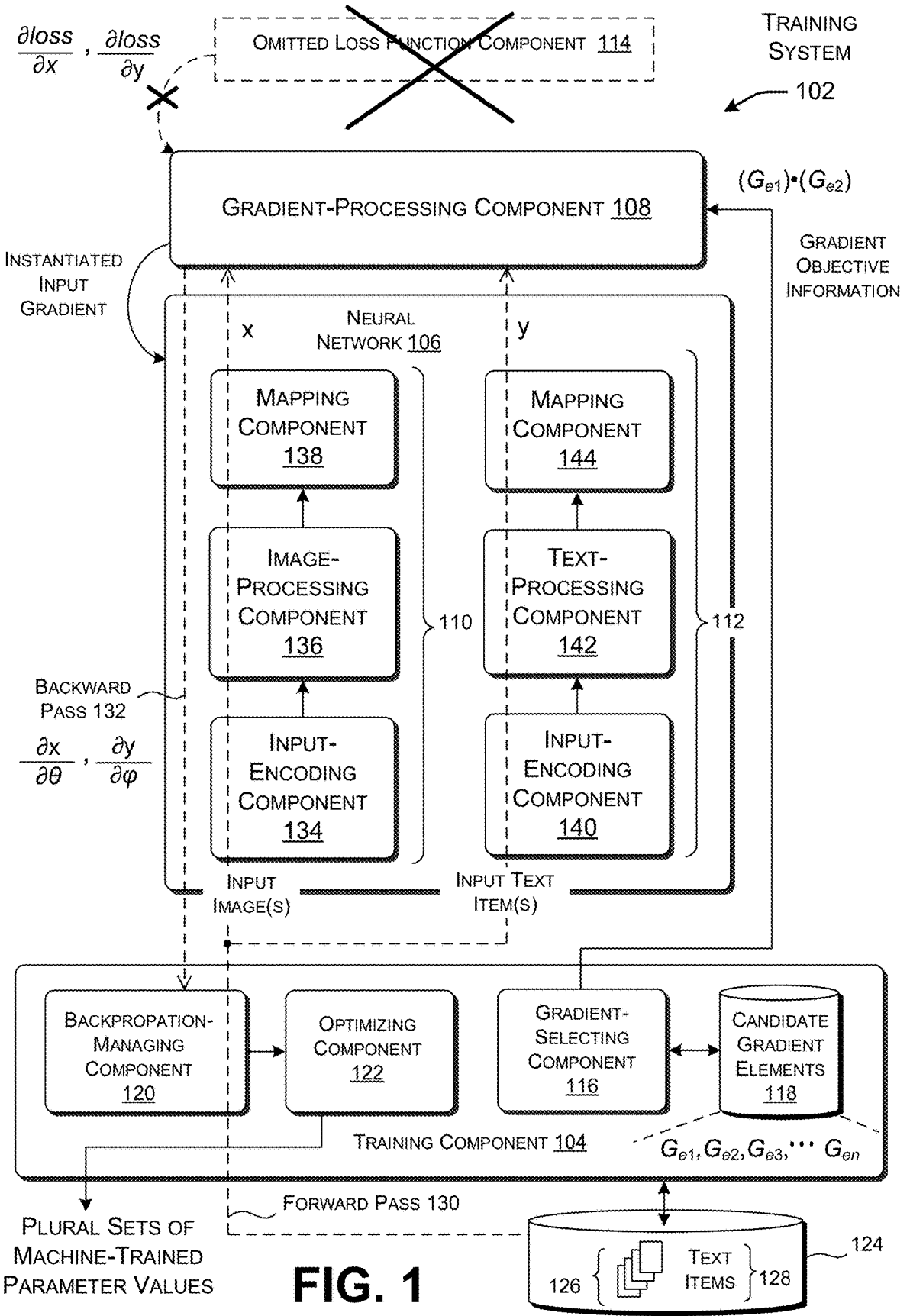

$$\frac{\partial loss}{\partial x} , \frac{\partial loss}{\partial y}$$

OMITTED LOSS FUNCTION COMPONENT  114

TRAINING SYSTEM

102

GRADIENT-PROCESSING COMPONENT 108

$(G_{e1})\cdot(G_{e2})$

GRADIENT OBJECTIVE INFORMATION

INSTANTIATED INPUT GRADIENT

NEURAL NETWORK 106 x          y

MAPPING COMPONENT 138

MAPPING COMPONENT 144

IMAGE-PROCESSING COMPONENT 136

TEXT-PROCESSING COMPONENT 142

110          112

BACKWARD PASS 132

$$\frac{\partial x}{\partial \theta} , \frac{\partial y}{\partial \varphi}$$

INPUT-ENCODING COMPONENT 134

INPUT-ENCODING COMPONENT 140

INPUT IMAGE(S)          INPUT TEXT ITEM(S)

BACKPROPATION-MANAGING COMPONENT 120

OPTIMIZING COMPONENT 122

GRADIENT-SELECTING COMPONENT 116

CANDIDATE GRADIENT ELEMENTS 118

TRAINING COMPONENT 104

$G_{e1}, G_{e2}, G_{e3}, \cdots G_{en}$

FORWARD PASS 130

PLURAL SETS OF MACHINE-TRAINED PARAMETER VALUES

FIG. 1

126   TEXT ITEMS   128

124

OTHER POSITIVE
TEXT VECTORS 208

POSITIVE
TEXT
VECTOR

OTHER NEGATIVE
TEXT VECTORS 210

204

$R^i_{x,y}$ $S_{x,y}$ $R^i_{x,y'}$

202

$S_{x,y'}$

206

IMAGE
VECTOR

NEGATIVE
TEXT
VECTOR

FIG. 2

GRADIENT-
PROCESSING
COMPONENT

GRADIENT
OBJECTIVE
INFORMATION

108

$x$
$y$
$y'$

SIMILARITY-
ASSESSING
COMPONENT
302

GRADIENT
INSTANTIATION
COMPONENT
306

INSTANTIATED
GRADIENT
INFORMATION

OPTIONAL ONLINE-
TRIPLET-MINING
COMPONENT 304

FIG. 3

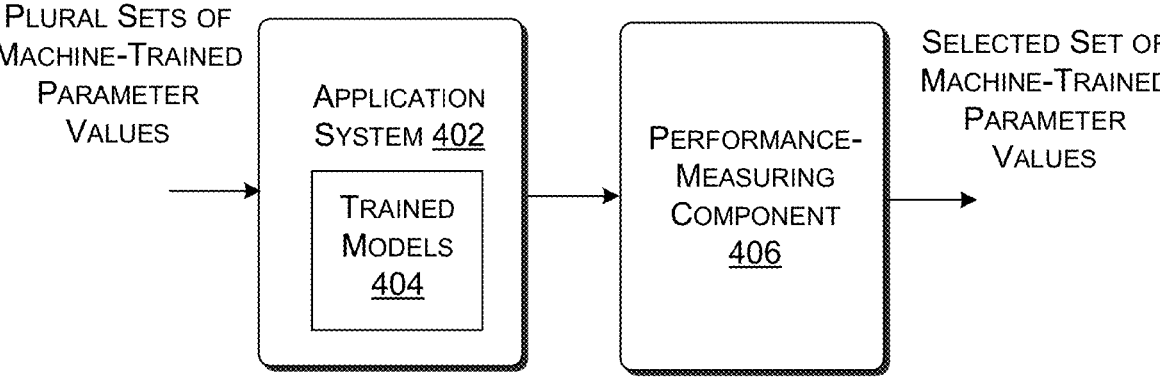

PLURAL SETS OF
MACHINE-TRAINED
PARAMETER
VALUES

APPLICATION
SYSTEM 402

TRAINED
MODELS
404

PERFORMANCE-
MEASURING
COMPONENT
406

SELECTED SET OF
MACHINE-TRAINED
PARAMETER
VALUES

FIG. 4

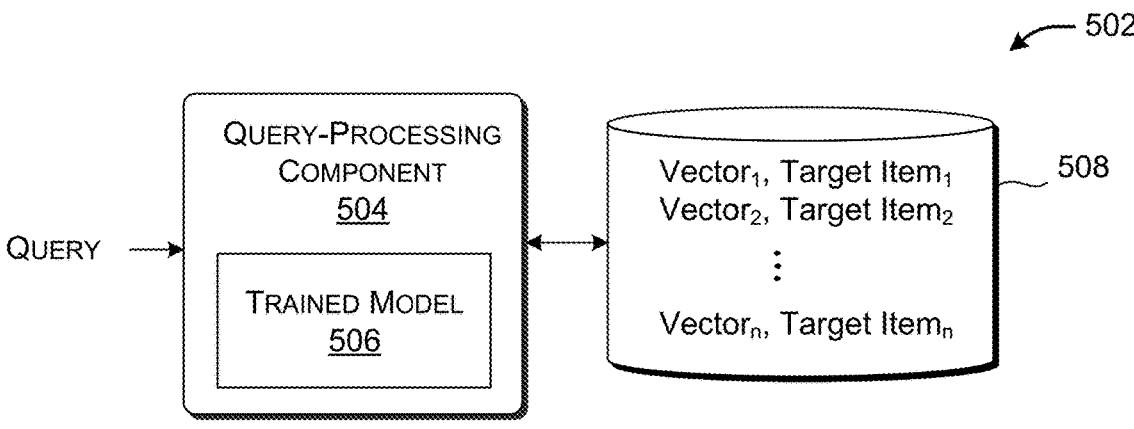
FIG. 5
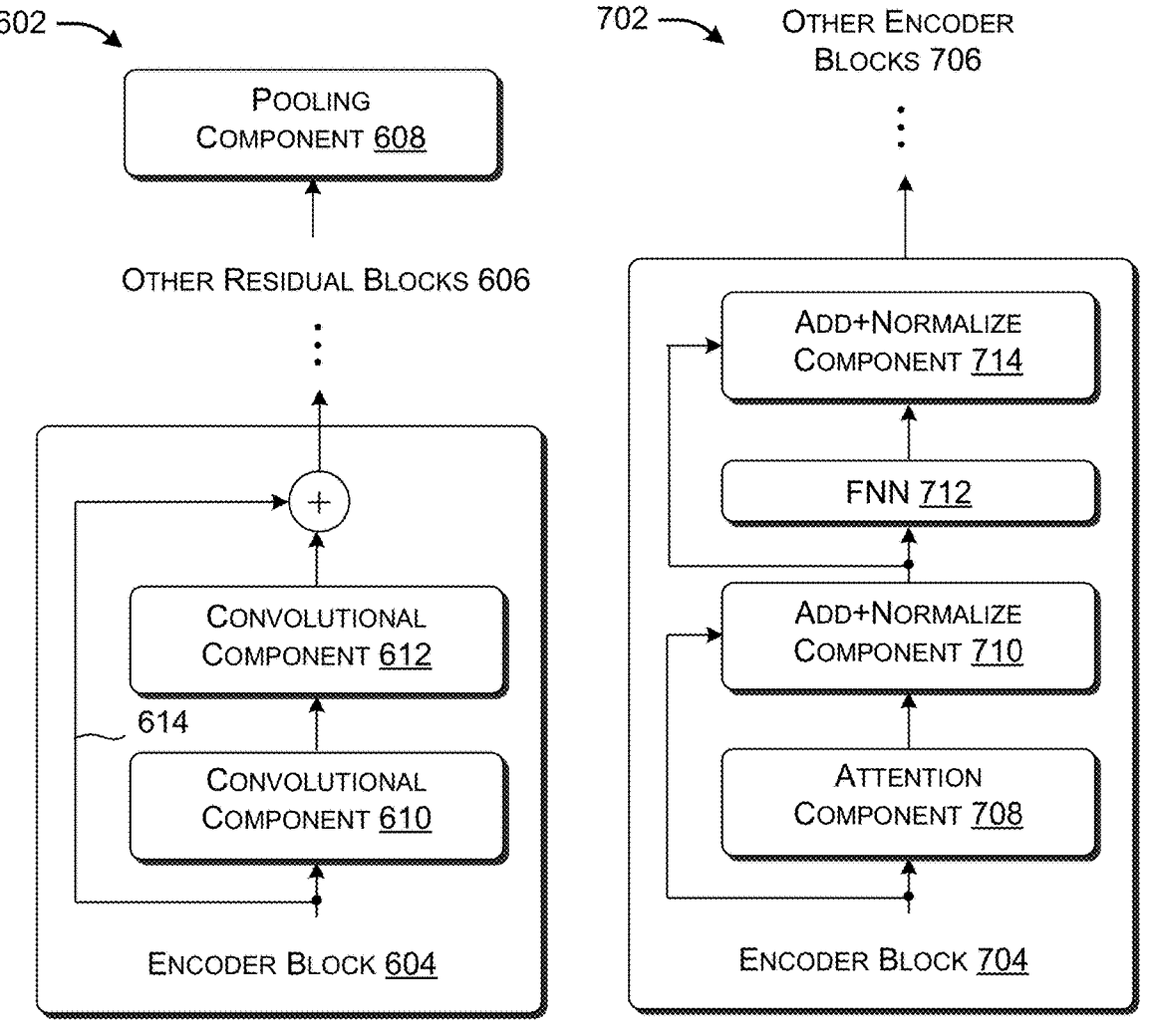
FIG. 6                     FIG. 7

|  | $T^{con}$ | $T^{nca}$ | $T^{cir}$ |
|---|---|---|---|
| $P^{con}$ | Triplet Loss | NT-Xent Loss | none |
| $P^{lin}$ | none | none | Circle Loss |
| $P^{sig}$ | Binomial Loss | none | none |
| $P^{lin\_ms}$ | none | none | none |
| $P^{sig\_ms}$ | MS Loss | none | none |

FIG. 10

|  | Image → Text | | | Text → Image | | |
|---|---|---|---|---|---|---|
|  | $T^{con}$ | $T^{nca}$ | $T^{cir}$ | $T^{con}$ | $T^{nca}$ | $T^{cir}$ |
| $P^{con}$ | 40.8 + 0.3 | 41.0 + 0.3 | 41.2 + 0.1 | 30.2 + 0.1 | 30.5 + 0.1 | 30.1 + 0.2 |
| $P^{lin}$ | 41.3 + 0.2 | 42.6 + 0.3 | 42.3 + 0.5 | 30.5 + 0.1 | 30.6 + 0.1 | 30.7 + 0.2 |
| $P^{sig}$ | 42.2 + 0.2 | 43.4 + 0.1 | 43.3 + 0.0 | 31.1 + 0.2 | 31.1 + 0.2 | 31.3 + 0.2 |
| $P^{lin-ms}$ | 41.8 + 0.3 | 42.6 + 0.6 | 42.8 + 0.2 | 30.7 + 0.1 | 30.9 + 0.1 | 31.0 + 0.2 |
| $P^{sig-ms}$ | 43.6 + 0.3 | 43.8 + 0.5 | 43.8 + 0.5 | 30.8 + 0.3 | 30.9 + 0.1 | 31.1 + 0.2 |

FIG. 11

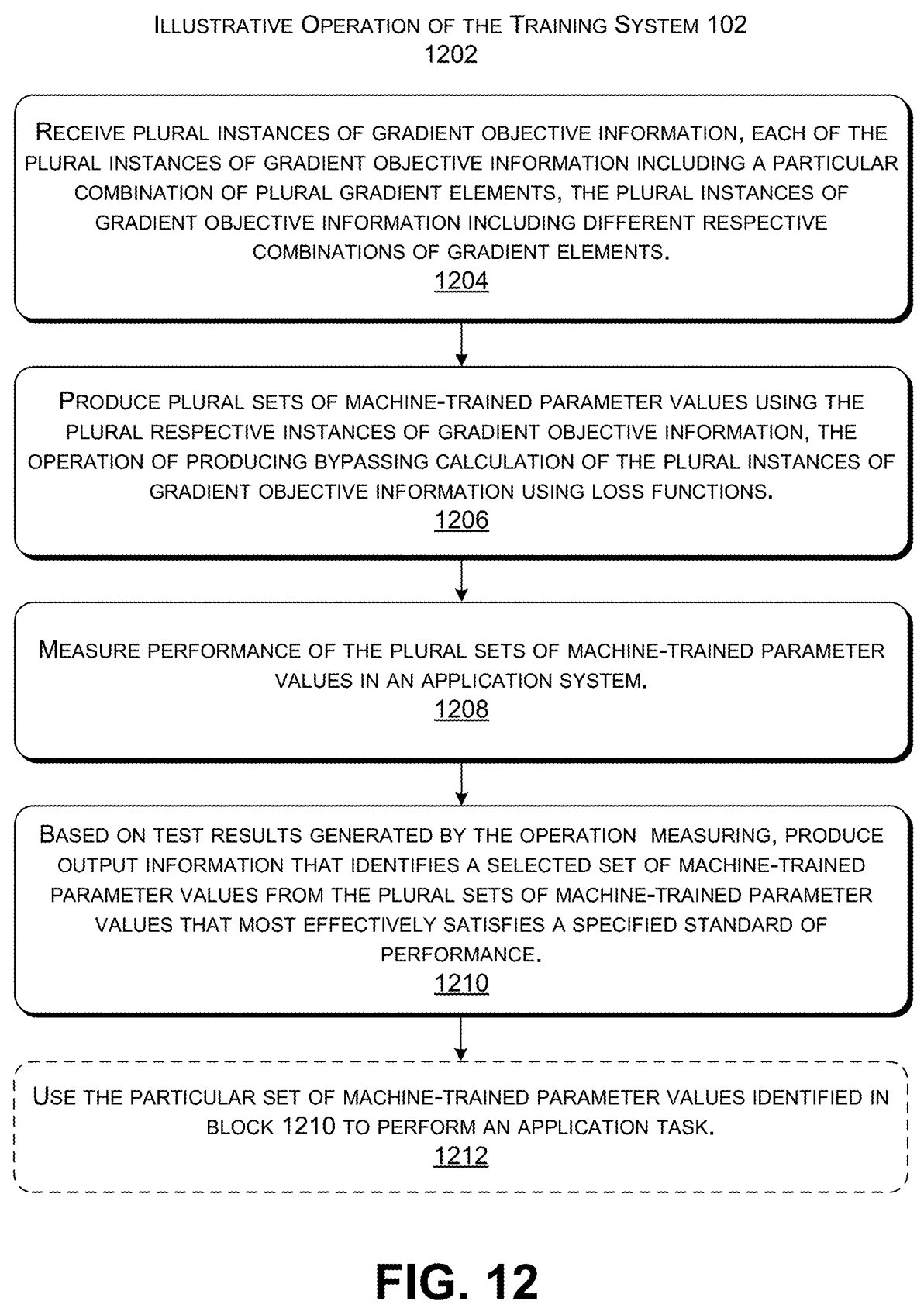

ILLUSTRATIVE OPERATION OF THE TRAINING SYSTEM 102
1202

RECEIVE PLURAL INSTANCES OF GRADIENT OBJECTIVE INFORMATION, EACH OF THE PLURAL INSTANCES OF GRADIENT OBJECTIVE INFORMATION INCLUDING A PARTICULAR COMBINATION OF PLURAL GRADIENT ELEMENTS, THE PLURAL INSTANCES OF GRADIENT OBJECTIVE INFORMATION INCLUDING DIFFERENT RESPECTIVE COMBINATIONS OF GRADIENT ELEMENTS.
1204

PRODUCE PLURAL SETS OF MACHINE-TRAINED PARAMETER VALUES USING THE PLURAL RESPECTIVE INSTANCES OF GRADIENT OBJECTIVE INFORMATION, THE OPERATION OF PRODUCING BYPASSING CALCULATION OF THE PLURAL INSTANCES OF GRADIENT OBJECTIVE INFORMATION USING LOSS FUNCTIONS.
1206

MEASURE PERFORMANCE OF THE PLURAL SETS OF MACHINE-TRAINED PARAMETER VALUES IN AN APPLICATION SYSTEM.
1208

BASED ON TEST RESULTS GENERATED BY THE OPERATION MEASURING, PRODUCE OUTPUT INFORMATION THAT IDENTIFIES A SELECTED SET OF MACHINE-TRAINED PARAMETER VALUES FROM THE PLURAL SETS OF MACHINE-TRAINED PARAMETER VALUES THAT MOST EFFECTIVELY SATISFIES A SPECIFIED STANDARD OF PERFORMANCE.
1210

USE THE PARTICULAR SET OF MACHINE-TRAINED PARAMETER VALUES IDENTIFIED IN BLOCK 1210 TO PERFORM AN APPLICATION TASK.
1212

FIG. 12

Figure 13:
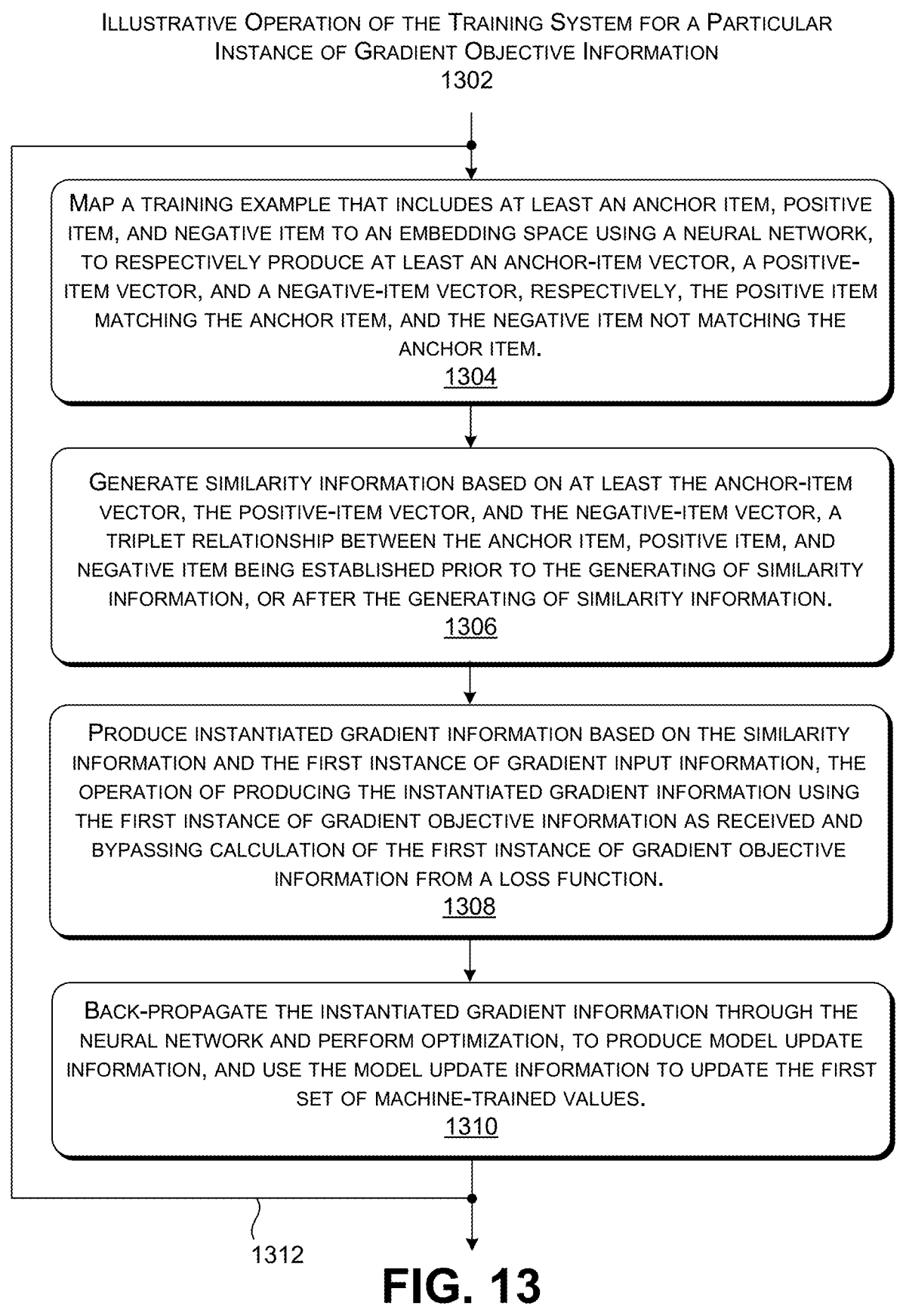

ILLUSTRATIVE OPERATION OF THE TRAINING SYSTEM FOR A PARTICULAR
INSTANCE OF GRADIENT OBJECTIVE INFORMATION
1302

MAP A TRAINING EXAMPLE THAT INCLUDES AT LEAST AN ANCHOR ITEM, POSITIVE ITEM, AND NEGATIVE ITEM TO AN EMBEDDING SPACE USING A NEURAL NETWORK, TO RESPECTIVELY PRODUCE AT LEAST AN ANCHOR-ITEM VECTOR, A POSITIVE-ITEM VECTOR, AND A NEGATIVE-ITEM VECTOR, RESPECTIVELY, THE POSITIVE ITEM MATCHING THE ANCHOR ITEM, AND THE NEGATIVE ITEM NOT MATCHING THE ANCHOR ITEM.
1304

GENERATE SIMILARITY INFORMATION BASED ON AT LEAST THE ANCHOR-ITEM VECTOR, THE POSITIVE-ITEM VECTOR, AND THE NEGATIVE-ITEM VECTOR, A TRIPLET RELATIONSHIP BETWEEN THE ANCHOR ITEM, POSITIVE ITEM, AND NEGATIVE ITEM BEING ESTABLISHED PRIOR TO THE GENERATING OF SIMILARITY INFORMATION, OR AFTER THE GENERATING OF SIMILARITY INFORMATION.
1306

PRODUCE INSTANTIATED GRADIENT INFORMATION BASED ON THE SIMILARITY INFORMATION AND THE FIRST INSTANCE OF GRADIENT INPUT INFORMATION, THE OPERATION OF PRODUCING THE INSTANTIATED GRADIENT INFORMATION USING THE FIRST INSTANCE OF GRADIENT OBJECTIVE INFORMATION AS RECEIVED AND BYPASSING CALCULATION OF THE FIRST INSTANCE OF GRADIENT OBJECTIVE INFORMATION FROM A LOSS FUNCTION.
1308

BACK-PROPAGATE THE INSTANTIATED GRADIENT INFORMATION THROUGH THE NEURAL NETWORK AND PERFORM OPTIMIZATION, TO PRODUCE MODEL UPDATE INFORMATION, AND USE THE MODEL UPDATE INFORMATION TO UPDATE THE FIRST SET OF MACHINE-TRAINED VALUES.
1310

TRAINING MACHINE-TRAINED MODELS BY DIRECTLY SPECIFYING GRADIENT ELEMENTS

BACKGROUND

Traditional approaches to building a machine-trained model begin by designing a differentiable loss function that defines a test for judging the accuracy of a machine-trained model's output results. A training system trains the machine-trained model by iteratively: (1) mapping training examples to output results using the machine-trained model; (2) using the loss function to measure the errors in the output results; and (3) using backpropagation and stochastic gradient descent to adjust the weights of the machine-trained model based on the errors that have been determined. Many training systems use a hinge-based triplet loss as the loss function. Triplet loss attempts to place matching pairs of data items close together while pushing non-matching pairs of data items far apart.

Traditional loss functions, however, do not always accurately model a training objective that a developer is attempting to achieve. This problem may stem, in part, from the difficulty a developer has in understanding all of the facets of a complex training objective, and/or the difficulty in expressing the training objective in mathematical form. A poorly chosen loss function can degrade the performance of any machine-trained model that a training system produces based on the loss function. For example, in some cases, the machine-trained model is applied to the task of generating synthesized images or audio items. A poorly-trained machine-trained model can lead to artifacts in the images or audio items. In other cases, a machine-trained model is integrated with a control system. A poorly-trained machine-trained model can cause the control system to take inappropriate actions. For instance, a defective face detection model can misrecognize a person's face, leading to the inappropriate admittance of that person to a secure facility. A defective object detection model provided in a moving vehicle may fail to detect an obstacle in the vehicle's path, leading to a collision. These are merely illustrative problems that may be the outcome of the selection of defective loss functions in different application environments.

SUMMARY

A computer-implemented technique is described herein for performing machine learning that bypasses the traditional design of loss functions. The technique includes receiving plural instances of gradient objective information. Each of the plural instances includes a particular combination of plural gradient elements. The technique produces plural sets of machine-trained parameter values using the plural respective instances of gradient objective information. That is, the technique performs this operation based on the plural instances of gradient objective information as given, without deriving the plural instances of gradient objective information from respective loss functions through differentiation. The technique then measures the performance of the plural sets of machine-trained parameter values in an application system. Based on the measured performance, the technique identifies a particular set of machine-trained parameter values that satisfies a prescribed test.

In some implementations, each particular instance of gradient objective information includes: a first gradient element that is part of a gradient of a first loss function; and a second gradient element that is part of a gradient of a second loss function, the second loss function being different than the first loss function.

In some implementations, an application system uses the selected set of machine-trained parameter values to perform an application. For instance, the application may correspond to a search application that identifies a text item that matches an input image. In other cases, the search application identifies an image that matches an input text item.

Among its technical merits, the technique produces an accurate machine-trained model in an expeditious manner. For instance, the technique eliminates the need for a developer to devise a suitable loss function for a problem domain, which can be a very difficult task in some complex problem domains that cannot easily be conceptualized using loss functions. The technique also provides a structured way of experimenting with different training objectives, in place of ad hoc trial-and-error approaches that have traditionally been used to improve model accuracy. These advantages benefit developers by reducing the time and effort involved in producing accurate machine-trained models. These advantages also result in a training process that makes use of less computing resources, compared to the ad hoc trial-and-error approaches.

The accuracy of the machine-trained model produced by the technique also contributes to a reduction in errors produced by an application system that uses the machine-trained model. In some cases, the errors that are reduced are manifested in the delivery of inaccurate search results or irrelevant digital advertisements or inaccurate BOT responses, etc. In other cases, the errors that are reduced appear as artifacts in corrected or synthesized images. In other cases, the errors that are reduced take the form of noise in audio output information. In other cases, the errors that are reduced correspond to misrecognition of faces or other objects. These types of errors, when they occur, can lead to inappropriate control actions, such as the failure to detect objects in the pathway of a moving vehicle, the erroneous admittance of unauthorized individuals to a restricted area, and so on.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 shows an illustrative training system for training a machine-trained model.

FIG. 2 depicts illustrative similarity information used in the training system of FIG. 1.

FIG. 3 shows an illustrative gradient-processing component, which is one element of the training system of FIG. 1.

FIG. 4 shows additional functionality used by the training system of FIG. 1.

FIG. 5 shows an illustrative application system that uses a machine-trained model produced by the training system of FIG. 1.

FIG. 6 shows a first model architecture that can be used in the training system of FIG. 1.

FIG. 7 shows a second model architecture that can be used in the training system of FIG. 1.

FIG. 10 is a table that shows relationships between loss functions and gradient elements.

FIG. 11 is a table that shows the performance of different machine-trained models produced by the training system of FIG. 1.

FIG. 12 is a flowchart that provides an overview of one manner of operation of the training system of FIG. 1.

FIG. 13 is a flowchart that provides additional details regarding the operation of the training system of FIG. 1.

Figures 8, 9:
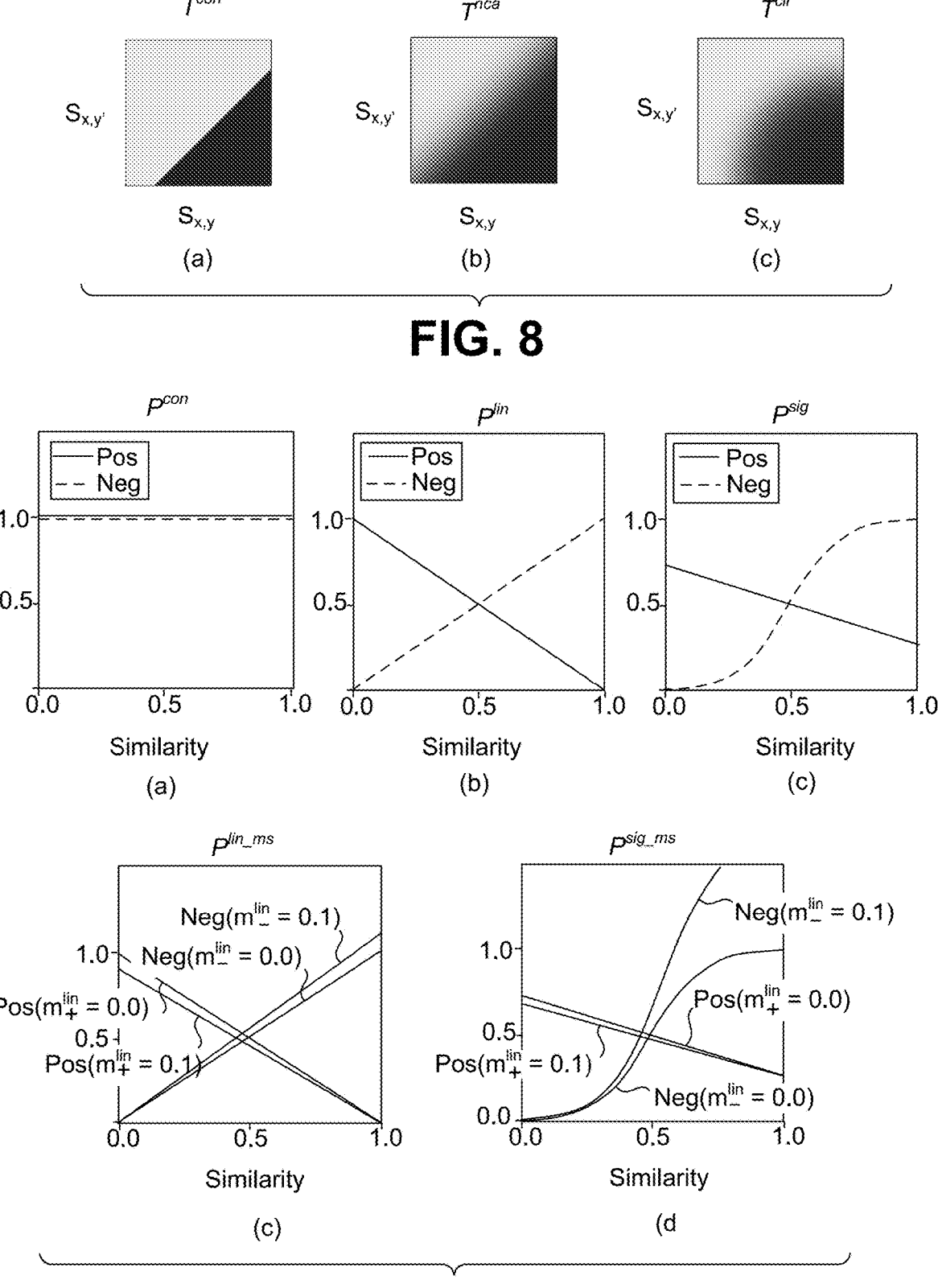
FIG. 8 shows characteristics of three different gradient elements, each gradient element relying on similarity information that is based on three input items of a triplet.
FIG. 9 shows characteristics of five gradient elements, each gradient element relying on similarity information that is based on two input items of a triplet.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A provides an overview of a training system for training a machine-trained model. Section A also describes an application system that make uses of the machine-trained model. Section B sets forth illustrative methods that explain the operation of the systems of Section A. And Section C describes illustrative computing functionality that can be used to implement any aspect of the features described in Sections A and B.

A. Illustrative Systems

A.1. Overview

FIG. 1 shows a training system 102 for producing a machine-trained model. The machine-trained model performs prescribed operations that are configured by machine-trained parameter values produced by the training system 102. In some implementations, the training system 102 produces a machine-trained model for use by a visual-semantic embedding (VSE) system. A VSE system identifies relations between images and text items. The VSE system can leverage these relations to retrieve images that match specified text items, or to retrieve text items that match specified images. As used herein, a "text item" refers to a natural language expression having one or more tokens (e.g., words).

The training system 102 can also be applied to produce other types of models. For instance, some implementations of the training system 102 can produce a machine-trained model that determines the relations between pairs of images. Other implementations of the training system 102 can produce a machine-trained model that determines the relations between pairs of text items. In still other cases, the training system 102 can produce a machine-trained model that performs an object-detection task, a face-recognition task, an image-correction or audio-correction task, an audio-recognition task, an image-synthesis task, and so on. To facilitate explanation, however, the following explanation will mostly refer to the illustrative case in which the machine-trained model produced by the training system 102 determines and leverages the relations between images and text items.

By way of overview, the training system 102 includes a training component 104, a neural network 106, and a gradient-processing component 108. The training component 104 includes functionality for managing the training of the machine-trained model. The neural network 106 represents logic that performs the operations of the machine-trained model, as influenced by the machine-trained parameter values being trained. Here, the neural network 106 includes a first neural network 110 that maps an input image to an image vector x in a shared embedding space. A second neural network 112 maps a text item to a text vector y in the same shared embedding space. Generally, any vector in this embedding space expresses the semantics of an input item using a distributed set of values. A vector in the embedding space can also be said to express the features of a corresponding input item (e.g., an image or text item). When the training system 102 completes its training, the vectors in embedding space that are close to each other correspond to semantically related items, while vectors in embedding space that are far away from each other correspond to semantically unrelated items.

The gradient-processing component 108 receives an instance of gradient objective information from the training component 104. The gradient objective information refers to the counterpart of the gradient of a loss function that has been traditionally produced by a loss function component 114. A loss function, in turn, provides logic for determining an extent to which the image vector x matches the text vector y. The gradient of a loss function can be generally expressed as $(\partial loss/\partial x, \partial loss/\partial y)$, representing the effect that changes in the vectors x and y have on the loss function (loss).

However, in the present case, the training system 102 does not use the loss function component 114, and, accordingly, the training system 102 does not involve computing the gradient of the loss function. FIG. 1 illustrates this point by crossing out the loss function component 114. In lieu of the use of the loss function component 114, the gradient-processing component 108 directly receives the gradient objective information from the training component 104. The gradient-processing component 108 produces instantiated gradient information based on the received gradient objective information. This operation involves substituting the similarity information, computed on the basis of the specific vectors x and y, into placeholder variables of the gradient objective information.

A gradient-selecting component 116 supplies the instance of gradient objective information sent to the gradient-processing component 108. The gradient-selecting component 116 composes the instance of gradient objective information based on gradient elements $(G_{e1}, G_{e2}, G_{e3}, \ldots G_n$ provided in a data store 118. A gradient element, in turn, corresponds to part of a gradient produced by differentiating a loss function. For example, consider a first loss function $loss_a$ having a gradient that includes plural terms, e.g., $G_{a1}, G_{a2}, G_{a3}$, and a second loss function $loss_b$ having a gradient that includes plural terms, e.g., $G_{b1}, G_{b2}, G_{b3}$. Each of these terms in the gradients constitutes a gradient element. In this simplified case, the gradient-selecting component 116 can compose an instance of gradient objective information that combines one or more gradient elements drawn from the two loss functions, such as a combination of the gradient elements $G_{a1}$ and $G_{b2}$. Note, however, that the data store 118 can also include gradient elements created by a developer that do not originate from gradients of preexisting loss functions. Further, the data store 118 can include gradient elements that are modifications of terms found in the gradients of loss functions, not direct copies. For example, the data store 118 can include a gradient element $G_{a'}$ that represents a modification of an actual gradient term $G_a$ produced by differentiating a loss function.

In some implementations, the gradient-selecting component 116 can combine plural gradient elements together by forming their product. In other implementations, the gradient-selecting component 116 can combine gradient elements by forming their sum. Other implementations can combine gradient elements in other ways, such as forming a weighted sum of gradient elements.

From a more encompassing standpoint, the training component 104 produces plural sets of machine-trained parameter values based on plural respective instances of gradient objective information. For example, in the above simplified example, the training component 104 can produce nine sets of machine-trained values based on different permutations of the gradient elements, such as a first set of machine-trained parameter values for the combination of $G_{a1}$ and $G_{b1}$, a second set of machine-trained parameter values for the combination $G_{a1}$ and $G_{b2}$, a third set of machine-trained parameter values for the combination of $G_{a1}$ and $G_{b3}$, and so on. As will be described below, the training system 102 can measure the performance of each set of machine-trained parameter values. A developer can use this evidence to select the set of machine-trained parameter values that meets a prescribed test, such as the set that offers the most favorable accuracy performance, the most favorable latency performance, etc., or any combination thereof.

A backpropagation-managing component 120 and an optimizing component 122 work together to produce each set of machine-trained parameter values based on different instances of gradient objective information. The training component 104 can perform this task in parallel or serial fashion. Assume that the training component 104 generates a first set of machine-trained values for a first instance of gradient objective information, which, in turn, includes the product of two gradient elements ($G_{e1} \cdot G_{e2}$).

The backpropagation-managing component 120 performs training on training examples drawn from a data store 124. The data store 124 specifically includes a set of images 126 and a set of text items 128. The data store 124 also stores information that indicates the established relationships between the images 126 and the text items 128. For instance, for a given image, the data store 124 can store information that indicates that a particular text item matches the image, and another text item does not match the image. This relationship information can be produced in any manner, e.g., based on labels applied by human annotators, based on the juxtaposition of images and descriptive labels in documents, and so on.

Each training example includes at least a triplet having a particular anchor item, a positive item, and a negative item. In some cases, the anchor item corresponds to an image item and the positive item corresponds to a text item that has been predetermined to match the image. The negative item corresponds to a text item that has been predetermined to not match the image. In other cases, the anchor item corresponds a text item and the positive item corresponds to an image that has been predetermined to match the text item. The negative item corresponds to an image that has been predetermined to not match the text item. To facilitate explanation, the description below will emphasize training performed with respect to the first kind of triplet, e.g., in which the image serves as the anchor item. However, all the principles set forth below apply with equal force to the case in which the text item serves as the anchor item.

In actual practice, the training system 102 can perform training on a batch X of images and a batch Y of text items, which the neural network maps into a set of image vectors and a set of text vectors, respectively. The gradient-processing component 108 then mines one or more triplets from these vectors in an online fashion, that is, without establishing these triplets in advance. In some implementations, online mining can specifically involve selecting "hard" negative items (e.g., text items) with respect to given anchor items (e.g., images). Each hard negative item is an item that is known to not match a corresponding anchor item, yet is closer in embedding space to the anchor than a corresponding positive item. The hard negative item is specifically "hard" insofar as it presents a non-trivial training example to the training system 102, which enables it to more effectively learn the parameter values. However, to simplify the explanation, the following explanation will take an agnostic view as to when and where the triplets are established. They can be established by some offline process a priori, or defined during training in online fashion. This further means that reference to a "training example" encompasses the case in which a corresponding triplet is established in the course of a training operation, and the case in which the triplet is established in advance.

The training component 104 performs its training in successive forward and backward passes. FIG. 1 illustrates a particular forward pass 130 and a particular backward pass 132. In the forward pass 130, the neural network 106 maps the image item to an image vector x in the embedding space, maps the matching text item to a vector y in the embedding space, and maps the non-matching text item to a vector y' in the embedding space. The gradient-processing component 108 then computes a score $S_{x,y}$ that expresses the semantic distance (e.g., the extent of semantic match) between the image item and the matching text item, and a score $S_{x,y'}$ that expresses the semantic distance between the image item and the non-matching text item. To repeat, in other cases, the roles of x and y are reversed. The gradient-processing component 108 then computes the instantiated gradient information using the gradient objective information based on at least the scores $S_{x,y}$ and $S_{x,y'}$.

Jumping ahead momentarily in the figures, FIG. 2 shows the relationships between an image vector 202, a positive text vector 204, and a negative text vector 206 in embedding space. Assume that the image vector 202 represents the features of an image that serves as the anchor item, the positive text vector 204 represents the features of a text item that matches the image, and the negative text vector 206 represents the features of a text item that does not match the image. In other cases, the gradient-processing component 108 can construct the instantiated gradient information based on additional vectors that have a relation to the image vector 202, such as other positive vectors 208 and/or other negative vectors 210.

Returning to FIG. 1, in the backward path 132, the backpropagation-managing component 120 uses the chain rule to back-propagate the instantiated gradient information backward through the levels of the neural network 106, level by level. That is, for a given level of the neural network 106, the backpropagation-managing component 120 maps input gradient information into output gradient information. That output gradient information serves as input for a next level of the neural network. When this backpropagation operation is finished, the operation produces final gradient information that describes how changes in the machine-trained param- eter values of the neural network 106 affect changes in the image vector and text vector. The optimizing component 122 can use the final gradient information to adjust the parameter values using some kind of optimization algorithm, such as scholastic gradient descent. Note that the backward path 132 follows the same path through the neural network 106 as the forward path 130. FIG. 1 shows the backward path 132 to the side of the components of the neural network 106 only to facilitate illustration.

Mathematically expressed, let $\theta$ represent the parameter values of the first neural network 110 that is used to produce image vectors, and let $\phi$ represent the parameter values of the second neural network 112 that produces text vectors. Let $f_\theta(\bullet)$ represent the mapping function applied by the first neural network 110 and $g_\theta(\bullet)$ represent the mapping function applied by the second neural network 112. Let $x_{batch}$ gen- erally represent the image vectors produced for a batch X of images, and $y_{batch}$ represent the text vectors produced for a batch Y of text items, which are respectively simplified as x and y in the following two equations. Traditionally, training systems produce loss information using the loss function component 114 in the forward pass based on a loss function $L(\bullet)$:

$$loss=L), L(x, y), \text{ where } x=f_\theta(X) \text{ and } y=g_\phi(Y) \quad (1).$$

The weights of the neural network 106 are then updated using the following equation:

$$\begin{cases} \theta^{t+1} = \theta^t - \eta \dfrac{\partial \text{loss}}{\partial x} \dfrac{\partial x}{\partial \theta} \\ \phi^{t+1} = \phi^t - \eta \dfrac{\partial \text{loss}}{\partial y} \dfrac{\partial y}{\partial \phi} \end{cases} \quad (2)$$

The first set of derivative terms ($\partial \text{loss}/\partial x$ and $\partial \text{loss}/\partial y$) expresses how changing image and text item embedded features (x, y) affects the loss. The second set of derivative terms ($\partial x/\partial \theta$ and $\partial y/\partial \phi$) represents how changing the mod- el's parameters affects the embedded features. The symbol $\eta$ denotes a learning rate that governs how quickly the training operation converges on an optimal set of parameter values. As noted above, in the present case, the training system 102 omits the loss function component 114 that would tradition- ally compute the first set of derivative terms. Instead, the gradient-processing component 108 directly receives gradi- ent objective information from the gradient-selecting com- ponent 116.

The training system 102 addresses the difficulty that arises in developing an accurate machine-trained model in many problem domains, including the visual-semantic embedding domain. This difficulty ensues from the fact that, in many problem domains, it is difficult for a developer to a priori conceptualize a loss function as a concise equation that expresses the training objective, with the added constraint that the loss function is capable of being differentiated. A faulty loss function can result in the production of a machine-trained model that produces substandard perfor- mance results, e.g., measured by accuracy and/or any other performance metric(s). Traditionally, a developer may address this situation by modifying the loss function and then retraining the machine-trained model based on the new loss function. However, this is an unstructured ad hoc approach that may consume significant time and effort, and can result in the commensurate expenditure of a large amount of computing resources. The computing resources include processor-related resources, memory-related resources, power, etc.

In part, the training system 102 addresses the above problem based on the insight that a training goal in some problem domains can often be more accurately expressed by directly specifying the gradient objective information, rather than a loss function. The training system 102 also provides a structured way of experimenting with different combina- tions of gradient elements. The training system 102 ulti- mately provides output information that reveals the combi- nation of gradient elements that produces the most favorable results (e.g., the most accurate results). This reduces the amount of time and effort required by the developer to produce the final machine-trained model, and also reduces computing resources used to produce the final machine- trained model.

Referring to the first neural network 110, an input-encod- ing component 134 converts the image item to one or more encoding vectors. For instance, the input-encoding compo- nent 134 can perform this task using a preliminary neural network that transforms the image into feature information. The preliminary neural network may include one or more layers of convolutional layers that perform convolutional operations. Or the input-encoding component 134 can par- tition the image into sub-images (patches), and then map the sub-images to respective encoded vectors. This mapping function can be implemented as a trainable linear projection.

An image-processing component 136 maps the encoding vector(s) into output feature information. Different imple- mentations can use different neural network architectures to implement the image-processing component 136. For example, the image-processing component 136 can be implemented as a ResNet model, one example of which is described in He, et al., "Deep Residual Learning for Image Recognition," arXiv:1512.03385v1 [cs.CV], Dec. 10, 2015, 12 pages. Or the first neural network 110 can be imple- mented as a transformer-based vision model, one example of which is described in Dosovitskiy, et al., "An Image is Worth 16×16 Words: Transformers for Image Recognition at Scale," arXiv:2010.11929v2 [cs.CV], Jun. 3, 2021, 22 pages. Further details regarding one implementation of the image-processing component 136 are provided below with reference to FIG. 6.

A mapping component 138 maps the feature information produced by the image-processing component 136 into the image vector x. The mapping component 138 can perform this task using a fully-connected neural network having any number of layers. The goal of the mapping component 138 is specifically to transform the output feature information into a form that can be directly compared with the text vector y produced by the second neural network 112, e.g., by producing an image vector x that has the same dimension- ality as the text vector y.

The second neural network 112 includes an input-encod- ing component 140 that maps a text item into one or more encoding vectors. The input-encoding component 140 per- forms this task by breaking the text item into one or more tokens. As used herein, a "token" or "text token" refers to a unit of text having any granularity, such as an individual word, a word fragment produced by byte pair encoding (BPE), a character n-gram, a word fragment identified by the WordPiece algorithm, etc. The input-encoding component 140 can then use a machine-trained linear transformation to map the tokens into respective encoding vectors.

A text-processing component 142 maps the encoding vector(s) into output feature information. Different implementations can use different neural network architectures to implement the text-processing component 142. For example, the text-processing component 142 can be implemented as a transformer-based model, one example of which is described in Devlin, et al., "BERT: Pre-training of Deep Bidirectional Transformers for Language Understanding," arXiv: 1810.04805v2 [cs. CL] May 24, 2019, 16 pages. Or the second neural network 112 can be implemented using a convolutional neural network, such as the network described in the commonly-assigned U.S. Published Patent application Ser. No. 20150278200 to He et al., published on Oct. 1, 2015, and having the title "Convolutional Latent Semantic Models and their Applications." Further details regarding one implementation of the text-processing component 142 is provided below with reference to FIG. 7.

A mapping component 144 maps the feature information produced by the text-processing component 142 into the text vector y. The mapping component 144 can perform this task using a fully-connected neural network having any number of layers. The goal of the mapping component 144 is specifically to transform the output feature information into a form that can be directly compared with the image vector x produced by the first neural network 110. Finally, note that the neural network 106 can normalize the vectors x and y, e.g., using the L2 (Euclidean) norm.

In some environments, the training system 102 of FIG. 1 produces a machine-trained model that subsequently functions as a multi-purpose pre-trained model. Another training system (not shown) performs further training on the pre-trained model to adapt it to perform a specific application task. Prior to this supplemental training, a developer can add one or more neural network layers to the "top" of the machine-trained model that are configured to perform further processing of output results generated by the machine-trained model.

Advancing to FIG. 3, this figure shows one implementation of the gradient-processing component 108. A similarity-assessing component 302 computes the similarity $S_{x,y}$ between vector x and vector y, and the similarity $S_{x,y'}$ between the vector x and the vector y', where vector x represents the anchor item (e.g., the image). For the case in which the vector y represents the anchor item, the similarity-assessing component 302 computes counterpart similarity scores $S_{y,x}$ and $S_{y,x'}$. The similarity-assessing component 302 can compute each similarity score using any distance metric, such as cosine similarity, Manhattan distance, etc. The output of the similarity-assessing component 302 can more generally be referred to as similarity information.

More specifically, in some cases, the triplet (x, y, y') is defined in advance, e.g., in an offline fashion. In other cases, an optional online triplet-mining component 304 performs the additional task of creating the triplet based on a batch of image vectors and text vectors, and based on similarity information generated by the similarity-generating component 302, e.g., by selecting a negative text item that has a prescribed "hard" relationship with an image. FIG. 3 should be broadly construed as encompassing at least these two cases.

A gradient instantiation component 306 produces an instance of instantiated gradient information based on the similarity information provided by the similarity-assessing component 302 and the gradient objective information provided by the gradient-selecting component 116. The gradient instantiation component 306 performs this operation by substituting the similarity information into placeholder variables in the gradient objective information.

FIG. 4 shows another aspect of the training system 102 of FIG. 1 not captured in FIG. 1. In this figure, an application system 402 uses a collection of machine-trained models 404 produced by the training component 104 to perform an application task, such as a search task described in more detail below with respect to FIG. 5. A performance-measuring component 406 measures the performance of each machine-trained model using any performance metric or combination of performance metrics. For example, the performance-measuring component 406 can use the Recall@1 metric to measure the retrieval accuracy of a search application. The Recall@1 metric measures whether a top-ranked target item identified by the application system 402 correctly matches an input query. In addition, or alternatively, the performance-measuring component 406 can measure the amount of computing resources that the application system 402 consumes in processing a user's query.

The performance-measuring component 406 can produce output information that allows a user to determine the relative merit of the different machine-trained models. The performance-measuring component 406 can also identify one or more machine-trained models that produce the most favorable results, e.g., by annotating the model(s) that produce the most accurate results. Based on this guidance, a developer can install a most favorable model in the production-stage version of the application system 402 that is available to end users.

FIG. 5 shows an example of an application system 502 that performs a search application. A query-processing component 504 uses a trained machine-trained model 506 produced by the training system 102 to map a query into a query vector in shared embedding space. For instance, in the case in which the query is an image, the query-processing component 504 uses a trained version of the first neural network 110 to map the image into an image vector in embedding space. In the case in which the query is a text item, the query-processing component 504 can use a trained version of the second neural network 112 to map the text item into a text vector in the embedding space.

A data store 508 stores feature information for a plurality of target items. For example, for the case in which query is an image, the data store 408 includes entries having text vectors for respective candidate text items. An offline feature-generating system (not shown) can produce these text vectors using a trained version of the second neural network 112. For the case in which the query is a text item, the data store 508 includes entries having image vectors for respective candidate images. The offline feature-generating system can produce these image vectors using a trained version of the first neural network 110. In other cases, the query-processing component 504 can compute the target-item vectors in a dynamic manner in response to the submission of user queries.

The query-processing component 504 can retrieve one or more target items having target-item vectors that are closest to the query vector in the shared embedding space. The query-processing component 504 can assess similarity in any manner, e.g., using a cosine-similarity metric. The query-processing component 504 can also use any algorithm to expedite its search for matching target items, e.g., any type of approximate nearest neighbor (ANN) search algorithm. Although not shown, the query-processing component 504 can perform additional mapping analysis using other machine-trained models. In other words, the matching described above may be part of a more encompassing matching process.

Another application system can use a trained model produced by the training system 102 to detect objects in an image. In some cases, the application system can incorporate a control system that takes appropriate actions based on the objects that are detected. For example, an application system can use the trained model to detect objects in a vehicle's path, based on video captured by an onboard video camera. The application system can then perform a control action based on the detection results, such as by applying the breaks of the vehicle.

Another application system can use a trained model produced by the training system 102 to recognize human faces. In some cases, the application system can incorporate a control system that performs an action based on recognition of a face, or the failure to recognize a face. For instance, the application system can control a lock or gate to enable or deny access to a restricted premises based on the output results produced by the trained model.

Another application system can use a trained model to transform an input image into an output image, e.g., by sharpening details in the input image, removing red eye or glare, etc. Another application system can use a trained model to synthesize an image based on input information. Another application system can use a trained model to recognize speech, and so on. The abovementioned application systems are set forth by way of example, not limitation.

In whatever form the application system takes, the training system 102 contributes to a reduction in errors in output results produced based on the application system. In some cases, the errors are manifested in the delivery of inaccurate search results or irrelevant digital advertisements or inaccurate BOT responses, etc. In other cases, the errors appear as artifacts in corrected or synthesized images. In other cases, the errors take the form of noise in audio output information. In other cases, the errors correspond to mis-recognition of faces or other objects. In addition to error-ridden output results, these types of errors can lead to inappropriate control actions, such as the failure to detect objects in the pathway of a moving vehicle, the erroneous admittance of unauthorized individuals to a restricted area, and so on.

More specifically, as explained above, it is difficult for a developer to formulate a loss function that expresses what constitutes good and bad model output results in many application domains. The training system 102 addresses this challenge by providing a structured way of experimenting with different combinations of gradient elements, foregoing the task of developing a comprehensive loss function, a priori. Because the selected set of gradient elements are tailor fit to the application domain, the application system can more accurately perform the task to which it is assigned, and consequently reduce errors in its output results and in control actions taken on the basis of those output results (compared to a model produced in a traditional manner using a manually-crafted loss function).

Further, an application system that uses a model trained by the training system 102 makes efficient use of computing resources. For instance, in the context of a search application, the application system can allow an end user to efficiently retrieve a matching text item given an image, or a matching image given a text item. These benefits result in the commensurate efficient use of computing resources by the application system. For example, an application system that quickly provides relevant answers to queries consumes on average less computing resources on a per-task basis than an application system that requires a user to engage in a prolonged trail-and-error approach to information retrieval.

FIG. 6 show a convolutional neural network (CNN) 602 that can be used to implement the first neural network 110 and/or the second neural network 112. The CNN 602 provides a pipeline that includes plural convolutional blocks (e.g., encoder blocks 604, 606) optionally interspersed with pooling components (e.g., representative pooling component 608). FIG. 6 shows a merely illustrative case in which the encoding block 604 includes a pair of convolutional components (610, 612). FIG. 6 also shows a residual connection 614 that adds input information fed to the first convolutional component 610 to output information produced by the second convolutional component 612.

Each convolutional component performs a convolution operation that involves moving an n×m kernel (e.g., a 3×3 kernel) across feature information supplied to the convolutional component. In the case of an input image, the feature information represents image information. In the case of an input text item, the feature information represents text information. At each position of the kernel, the encoding subcomponent generates the dot product of the kernel values with the underlying values of the feature information. Each pooling component down-samples results of a preceding convolutional operation using some sampling function, such as a maximum operation that selects a maximum value within a subset of values.

FIG. 7 shows a transformer-based neural network 702 that can be used to implement the first neural network 110 and/or the second neural network 112. The transformer-based neural network 702 provides a pipeline that includes plural encoder blocks (e.g., encoder blocks 704, 706). FIG. 7 shows a representative architecture of the first encoder block 704. Although not shown, other encoder blocks share the same architecture as the first encoder block 704.

The encoder block 704 includes, in order, an attention component 708, an add-and-normalize component 710, a feed-forward neural network (FFN) 712, and a second add-and-normalize component 714. The attention component 708 performs self-attention analysis using the following equation:

$$\text{Attention } (Q, K, V) = \text{Softmax}\left(\frac{QK^T}{\sqrt{d}}\right)V. \tag{3}$$

That is, the attention component 708 produces query information Q, key information K, and value information V by multiplying the input vectors fed to the attention component 708 by three respective machine-trained matrices, $W^Q$, $W^K$, and $W^V$. More specifically, the attention component 708 takes the dot product of Q with the transpose of K, and then divides the dot product by a scaling factor $\sqrt{d}$, to produce a scaled result. The symbol d represents the dimensionality of the transformer-based neural network 702. The attention component 708 takes the Softmax (normalized exponential function) of the scaled result, and then multiples the result of the Softmax operation by V, to produce attention output information. More generally stated, the attention component 708 determines the importance of each input vector under consideration with respect to every other input vector. Background information regarding the general concept of attention is provided in Vaswani, et al., "Attention Is All You Need," in 31st Conference on Neural Information Processing Systems (NIPS 2017), 2017, 11 pages.

The add-and-normalize component 710 includes a residual connection that combines (e.g., sums) input information fed to the attention component 708 with the output information generated by the attention component 708. The add-and-normalize component 710 then performs a layer normalization operation on the output information generated by of the residual connection, e.g., by normalizing values in the output information based on the mean and standard deviation of those values. The other add-and-normalize component 714 performs the same functions as the first-mentioned add-and-normalize component 710. The FFN 712 transforms input information to output information using a feed-forward neural network having any number of layers.

A.2 Illustrative Gradient Elements

This subsection will describe illustrative gradient elements that can be used by the gradient-selecting component 116 to compose an instance of gradient objective information. There is a large number of candidate gradient elements that can be included in the data store 124. By way of example and not limitation, this subsection will specifically describe examples of gradient components that originate from gradients of known loss functions used in deep metric learning (DML) applications.

In the following description, $S_{x,y}=x^T y$ and $S_{x,y'}=x^T y'$ respectively represent the cosine similarity scores computed for a positive pair (x, y) and a negative pair (x, y') of normalized encoding vectors. $S_{y,x}=y^T x$ and $S_{y,x'}=y^T x'$ respectively represent the cosine similarity scores computed for a positive pair (y, x) and a negative pair (y, x') of normalized encoding vectors. A traditional symmetric triplet loss function based on the above-described similarity scores can be expressed as $loss=L(S_{x,y}, S_{x,y'})+L(S_{y,x}S_{y,x'})$. The gradients of this loss function are:

$$
\begin{cases}
\dfrac{\partial loss}{\partial x} = \dfrac{\partial loss}{\partial S_{x,y}}\dfrac{\partial S_{x,y}}{\partial x} + \dfrac{\partial loss}{\partial S_{x,y'}}\dfrac{\partial S_{x,y'}}{\partial x} + \dfrac{\partial loss}{\partial S_{y,x}}\dfrac{\partial S_{y,x}}{\partial x} \\
\dfrac{\partial loss}{\partial x} = \dfrac{\partial L(S_{x,y}, S_{x,y'})}{\partial S_{x,y}}y + \dfrac{\partial L(S_{x,y}, S_{x,y'})}{\partial S_{x,y'}}y' + \\
\qquad\qquad \dfrac{\partial L(S_{y,x}, S_{y,x'})}{\partial S_{y,x}}y
\end{cases} \quad (4.1)
$$

$$
\begin{cases}
\dfrac{\partial loss}{\partial y} = \dfrac{\partial loss}{\partial S_{x,y}}\dfrac{\partial S_{x,y}}{\partial y} + \dfrac{\partial loss}{\partial S_{y,x}}\dfrac{\partial S_{y,x}}{\partial y} + \dfrac{\partial loss}{\partial S_{y,x'}}\dfrac{\partial S_{y,x'}}{\partial y} \\
\dfrac{\partial loss}{\partial y} = \dfrac{\partial L(S_{x,y}, S_{x,y'})}{\partial S_{x,y}}x + \dfrac{\partial L(S_{y,x}, S_{y,x'})}{\partial S_{y,x}}x + \\
\qquad\qquad \dfrac{\partial L(S_{y,x}, S_{y,x'})}{\partial S_{y,x'}}x'
\end{cases} \quad (4.2)
$$

There are two kinds of gradient terms in the above expression: a first group ($\partial L(S_{x,y}, S_{x,y'})/\partial S_{x,y}$, $\partial L(S_{x,y}, S_{x,y'})/\partial(S_{x,y'}$, $\partial L(S_{x,y}, \partial L(S_{y,x}, S_{y,x'})/\partial S_{y,x}$, and $\partial L(S_{y,x}, S_{y,x'})/\partial S_{y,x'}$) that express scalar gradient weights, and a second group (x, y, x', and y') that express directions in embedding space. Different specific triplet loss functions vary principally due to the use of different logic used to compute the scalar gradient weights. The following explanation will therefore focus its attention on the scalar components of gradient elements.

More specifically, the following explanation will first describe three illustrative gradient elements of a first kind, each of which depends on all three items of a triplet under consideration (e.g., {x, y, and y'}, or {y, x, and x'}). This type of gradient element is referred to as a triplet-based gradient weight and is denoted by the symbol T. The description will then describe another five illustrative gradient elements of a second kind, each of which specifies a relation among two of the three items of a triplet under consideration. This type of gradient element is referred to as a pair-based triplet weight and is denoted by the symbol P. The following explanation will more specifically describe gradient weights for the case in which x is the anchor item. The counterpart gradient weights for the case in which y is the anchor item will follow therefrom, e.g., by replacing y with x, and replacing x' with y'.

Constant Triplet Gradient Weights

The gradient of a standard triplet loss function can be derived as:

$$
\begin{cases}
loss^{tri} = \max(m + S_{x,y'} - S_{x,y}, 0) + \max(m + S_{y,x'} - S_{y,x}, 0) \\
\dfrac{\partial loss^{tri}}{\partial x} = \delta(m + S_{x,y'} - S_{x,y})(y' - y) - \delta(m + S_{y,x'} - S_{y,x})y \\
\dfrac{\partial loss^{tri}}{\partial y} = -\delta(m + S_{x,y'} - S_{x,y})x + \delta(m + S_{y,x'} - S_{y,x})(x' - x)
\end{cases} \quad (5)
$$

In these equations, m is a margin parameter and $\delta(\bullet)$ is the Heaviside step function, in which H(x) is 1 for x>0, and H(x) is 0 for x≤0.

In the gradient of the triplet loss function, each of the scalars is a triplet-based gradient weight because it depends on similarity scores for both positive and negative pairs of a triplet. The triplet weight $T^{con}$ for the case in which x is the anchor item is:

$$
T^{con}=\delta(m+S_{x,y'}-S_{x,y}) \quad (6).
$$

When the Heaviside step function is activated, $T^{con}$ reduces to a constant 1. When the Heaviside step function is not activated, $T^{con}$ is 0, indicating that the triplet under consideration has no impact on the gradient. $T^{con}$ for the case in which y is the anchor item is given by the counterpart of Equation (6), e.g., by replacing $S_{x,y}$ with $S_{y,x}$, and replacing $S_{x,y'}$ with $S_{y,x'}$. Background information on the general topic of triplet loss functions can be found in Scroff, et al., "FaceNet: A Unified Embedding for Face Recognition and Clustering," arXiv:1503.03832v3 [cs.CV], Jun. 17, 2015, 10 pages.

NT-Xent Gradient Weights

A second common loss function is the NT-Xent loss derived from neighborhood component analysis (NCA), denoted as $loss^{nca}$. This loss function can be expressed as:

$$
loss^{nca} = \\
-\log\left(\frac{\exp(\tau S_{x,y})}{\exp(\tau S_{x,y}) + \exp(\tau S_{x,y'})}\right) - \log\left(\frac{\exp(\tau S_{y,x})}{\exp(\tau S_{y,x}) + \exp(\tau S_{y,x'})}\right). \quad (7)
$$

In this equation, $\tau$ is the scaling parameter. Each scalar in $T^{nca}$ is given by:

$$
T^{nca} = \frac{1}{1 + \exp(\tau(S_{x,y} - S_{x,y'}))}. \quad (8)
$$

$T^{nca}$ a relies on the difference between $S_{x,y}$ and $S_{x,y'}$. When the difference is greater than zero (e.g., $S_{x,y}-S_{x,y'}>0$), $T^{nca}$ is relatively small. Otherwise, $T^{nca}$ will be relatively large. Background information on the general topic of the NT-Xent loss function can be found in Sohn, Kihyuk, "Improved Deep Metric Learning with Multi-class N-pair Loss Objective," in Proceedings of the 30th Conference on Neural Information Processing Systems (NIPS 2016), 2016, 9 pages. Background information on the general topic of neighborhood component analysis can be found in Goldberger, et al., "Neighbourhood Components Analysis," in Proceeding of Advances in Neural Information Processing Systems 17 (NIPS 2004), 2004, 8 pages.

Circle Gradient Weights

The above-described gradient weight $T^{nca}$ a depends on the difference in similarity scores ($S_{x,y}-S_{x,y'}$). This relationship does not adequately represent some corner cases in which both $S_{x,y}$ and $S_{x,y'}$ are relatively large, or both $S_{x,y}$ and $S_{x,y'}$ are relatively small. A circle loss function addresses these cases using the following gradient weight $T^{cir}$:

$$T^{cir} = \frac{1}{1 + \exp(\tau(S_{x,y}(2 - S_{x,y}) - S_{x,y'}^2))}. \tag{9}$$

$T^{cir}$ specifically introduces a non-linear mapping for $S_{x,y}$ and $S_{x,y'}$ in the exponential term that places more weight on the above-noted corner cases. Background information on the general topic of the circle loss function can be found in Sun, et al., "Circle Loss: A Unified Perspective of Pair Similarity Optimization," arXiv:2002.10857v2 [cs.CV], Jun. 15, 2020, 10 pages.

FIG. 8 shows three diagrams that describe the characteristics of the above-described triplet-based weights. The horizontal axis of each diagram specifically represents similarity scores for a positive image-text pair, and the vertical axis of each diagram represents similarity scores for a counterpart negative image-text pair. The darkness of a point in the diagrams represents the magnitude of the gradient weight (from 0 to 1), e.g., such that relatively large gradient weights map to relatively dark points and relatively small gradient weights map to relatively light points. Each of these diagrams will generally place triplets in which the anchor-item features, positive-item features, and negative-item features are all very similar near the top right corner of the diagram, and will generally place triplets in which positive pairs are similar while corresponding negative pairs are not similar near the bottom right corner of the diagram.

More specifically, diagram (a) in FIG. 8 shows the behavior of the constant triplet gradient weight $T^{con}$ with m=0.2, diagram 8(b) shows the behavior of the NT-Xent weight $T^{nca}$ a with τ=10, and diagram 8(c) shows the behavior of the circle gradient weight $T^{cir}$ with τ=10. Diagram 8(a) for $T^{con}$ shows a sharp equal-weight line that distinguishes uniformly high $T^{con}$ values from uniformly low $T^{con}$ values. Diagram 8(b) for $T^{nca}$ includes a more gradual transition from high $T^{nca}$ values to low $T^{nca}$ values, but the transition between high-to-low values generally extends across the diagram in a linear manner. Diagram 8(c) demonstrates how $T^{cir}$ modifies $T^{nca}$ by more effectively accounting for the above-described corner cases. That is, the equal weight boundary in $T^{nca}$ is a straight line with the form $S_{x,y}-S_{x,y}$=const. In contrast, the equal weight boundary in $T^{cir}$ is a circular line with form $$(S_{x,y} - 1)^2 + S_{x,y'}^2 = \text{const.,}$$

demonstrating how $T^{cir}$ increases the weight for the corner cases.

Constant Pair-Based Gradient Weights

Now advancing to a description of pair-based triplet weights P, a gradient weight for a positive pair is denoted by $P_+$, and a gradient weight for a negative pair is denoted by $P_-$. For constant pair-based weights, the gradient weights for both positive pairs and negative pairs are set to a constant of 1. In other words, $$P_+^{con} = P_-^{con} = 1. \tag{10}$$

The training system 102 introduces constant pair-based weights principally as a way of creating instances of gradient objective information in which pair-based weighting plays no role. That is, multiplying a triplet-based weight by a pair-based constant weight of 1 yields the original triplet-based weight.

Linear Pair-Based Gradient Weights

Good training results are achieved by assigning a relatively large gradient weight to a negative pair for the case in which the pair's vectors are close together in embedding space. Otherwise, the training system 102 can quickly converge to a faulty local minima. The circle loss function addresses this issue by applying a linear pair weight $P^{lin}$. More specifically, for a negative pair, $P^{lin}$ is relatively large if the similarity between its component vectors are relatively large, and is relatively small if the similarity is relatively small. For a positive pair, $P^{lin}$ is relatively large when the similarity between the component vectors is relatively small, and is relatively small if the similarity is relatively large. In other word:

$$\begin{cases} P_+^{lin} = 1 - S_{x,y} \\ P_-^{lin} = S_{x,y'} \end{cases} . \tag{11}$$

Binomial Deviance Gradient Weights

A binomial deviance gradient weight $P^{sig}$ expresses the same type of relationship as the linear pair-based weights, but incorporates the influence of a nonlinear sigmoid:

$$\begin{cases} P_+^{sig} = \frac{1}{1 + \exp(\alpha(S_{x,y} - \lambda))} \\ P_-^{sig} = \frac{1}{1 + \exp(-\beta(S_{x,y'} - \lambda))} \end{cases} . \tag{12}$$

In this equation, α, β and λ are three hyper-parameters. Background information on the general topic of the binomial variance loss function can be found in Yi, et al., "Deep Metric Learning for Practical Person Re-Identification," in arXiv:1407.4979v1 [cs.CV], Jul. 18, 2014, 11 pages.

Multi-Similar Gradient Weights

A multi-similar (MS) gradient weight $P^{sig\_ms}$ relies on similarity scores for a positive pair and counterpart negative pair, $S_{x,y}$ and $S_{x,y'}$, respectively. These scores are referred to below as self-similarity scores. The multi-similar gradient weight $P^{sig\_ms}$ also depends on other positive and negative pairs in a batch, with respect to the same anchor. Each such other positive pairing is denoted by $$R^i_{x,y},$$

and each such other negative pairing is denoted by $$R^j_{x,y'}.$$

$\mathcal{P}$ represents a selected set of positive pairings $$R^i_{x,y}$$

and $\mathcal{N}$ represents a selected set of negative pairings $$R^j_{x,y'}.$$

$$P^{sig\_ms}_+$$

(for a positive pair) and $$P^{sig\_ms}_-$$

(for a negative pair) are defined by the following three equations, the first of which establishes a test for constructing the two sets $\mathcal{P}$ and $\mathcal{N}$ :

$$\begin{cases} \mathcal{P} = \left\{ R^i_{x,y} : R^i_{x,y} < \max\left\{ S_{x,y'}, R'^j_{x,y} \right\} + \epsilon \right\} \\ \mathcal{N} = \left\{ R^j_{x,y} : R'^j_{x,y} > \min\left\{ S_{x,y}, R^i_{x,y} \right\} - \epsilon \right\} \end{cases}, \quad (13)$$

$$\begin{cases} P^{sig\_ms}_+ = \dfrac{1}{m^{sig}_+ + \exp(\alpha(S_{x,y} - \lambda))} \\ P^{sig\_ms}_- = \dfrac{1}{m^{sig}_- + \exp(-\beta(S_{x,y'} - \lambda))} \end{cases}, \quad (14)$$

where $$m^{sig}_+ \text{ and } m^{sig}_-$$

used in Equation (14) are defined by:

$$\begin{cases} m^{sig}_+ = \dfrac{1}{|\mathcal{P}|} \sum_{\mathcal{P}} \exp\left(\alpha\left(S_{x,y} - R^i_{ap}\right)\right) \\ m^{sig}_- = \dfrac{1}{|\mathcal{N}|} \sum_{\mathcal{N}} \exp\left(-\beta\left(S_{x,y'} - R^j_{an}\right)\right) \end{cases}. \quad (15)$$

The symbols $\alpha$, $\beta$, $\lambda$, and $\epsilon$ are hyper-parameters. Two terms in Equations (14) cause the value of $P^{sig\_ms}$ to dynamically change. The first term (the self-similarity term) depends on a self-similarity score, while the second term (the relative-similarity term) depends on relative similarity scores. The self-similarity term specifically has the same effect as it does in the sigmoid pair weight $P^{sig}$. The relative-similarity term has the effect of increasing or decreasing the maximum magnitude of the pair weight.

More specifically, given a negative pair, when the relative-similarity term $$m^{sig}_- > 1,$$

the selected negative example is closer to the anchor example compared to other negative examples. Here, the negative gradient weight increases because the relative-similarity term decreases the value in the denominator in $$P^{sig\_ms}_-.$$

When the relative-similarity term $$m^{sig}_- < 1,$$

the selected negative example is relatively far away from the anchor example compared to other negative examples. Here, the negative gradient weight decreases because the relative-similarity term increases the value of the denominator in $$P^{sig\_ms}_-.$$

Given a positive pair, when the relative-similarity term $$m^{sig}_+ > 1,$$

the selected positive pair has a degree of similarity larger than other positive pairs in its batch. Here, the positive gradient weight decreases because the relative-similarity term increases the value in the denominator in $$P^{sig\_ms}_+.$$

When the relative-similarity term $$m^{sig}_+ < 1,$$

the selected positive pair has a degree of similarity less than other positive pairs in its batch. Here, the positive gradient weight increases because the relative term decreases the value in the denominator in $$P^{sig\_ms}_+.$$

Finally, when $$m_+^{sig} = m_-^{sig} = 1,$$

the gradient weights reduce to the sigmoid form given in Equation (12). In conclusion, the relative-similarity term has the principal effect of dynamically increasing or decreasing the maximum penalty for positive and negative pairs. Background information on the general topic of the multi-similar loss function can be found in Wang, et al., "Multi-Similarity Loss with General Pair Weighting for Deep Metric Learning," arXiv repository, arXiv:1904.06627v3 [cs.CV], Mar. 23, 2020, 12 pages.

In practice, training with the use of MS loss involves tuning four hyper-parameters $\alpha$, $\beta$, $\lambda$ and $\epsilon$ to fit different datasets. This operation complicates the training of the machine-trained models, and renders it inefficient. To address this issue, a linear version of the above-described gradient weight can be used that shares its same general behavior, referred to as linear pair weight $P^{lin\_ms}$. This gradient weight is defined as:

$$\begin{cases} P_+^{lin\_ms} = \left(1 - m_+^{lin}\right)(1 - S_{x,y}) \\ P_-^{lin\_ms} = \left(1 + m_-^{lin}\right)S_{x,y'} \end{cases} \quad (16)$$

$$\text{where} \begin{cases} m_+^{lin} = \frac{1}{|\mathcal{P}|}\sum_{\mathcal{P}}\left(S_{x,y} - R_{x,y}^i\right) \\ m_-^{lin} = \frac{1}{|\mathcal{N}|}\sum_{\mathcal{N}}\left(S_{x,y'} - R_{x,y'}^j\right) \end{cases} \quad (17)$$

FIG. 9 shows the behaviors of the above-described pair-based gradient weights. More specifically, diagram 9(*a*) shows the behavior of the constant pair-based weight gradient $P^{con}$. Diagram 9(*c*) shows the behavior of the linear-based weight gradient Pun Diagram 9(*c*) shows the behavior of the binomial deviance weight gradient $P^{sig}$ with $\alpha=0.2$, $\beta=10$, and $\lambda=0.5$. Diagram 9(*d*) shows the linear version of the MS loss gradient weight with $$m_+^{lin} = m_-^{lin} = 1.$$

Diagram 9(*e*) shows the behavior of the sigmoid version of the MS loss gradient weight with $$m_+^{sig} = m_-^{sig} = 1.$$

More generally, the horizontal axis of each diagram shows the similarity score for a pair, and the vertical axis of each diagram describes the value of a particular pair-based gradient weight.

To repeat, the above-described gradient elements were set forth here by way of example, not limitation. In other implementations, the gradient elements can be drawn from the following loss functions known in the technical literature: Angular Loss, Arc Face Loss, Base Metric Loss Function, Centroid Triplet Loss, Contrastive Loss, Cos Face Loss, Cross Batch Memory, Fast AP Loss, Generic Pair Loss, Lifted Structure Loss and its variants, Intra-Pair Variance Loss, Large Margin Softmax Loss, Margin Loss, Normalized Softmax Loss, N-Pairs Loss, Proxy Anchor Loss, Proxy NCA Loss, Signal-To-Noise Ratio Contrastive Loss, Soft Triple Loss, Sphere Face Loss, Sub-Center Arc Face Loss, Supervised Contrastive Learning, Triplet Margin Loss, Tuplet Margin Loss, Weight Regularizer Mixing Loss, VICReg Loss, etc.

FIG. 10 shows nine different combinations of gradient elements that draw from the above-described triplet-based and pair-based gradient weights. In some cases, a particular combination corresponds to the set of gradient elements that is produced by differentiating a loss function. For example, differentiation of the circle loss function produces a $T^{cir}$ gradient weight and a $P^{lin}$ gradient weight. In other cases, a particular combination has no direct counterpart in the derivation of any loss function. Each such combination is unexplored in the technical literature and is denoted in FIG. 10 with the label "none." Although not shown, the training system 102 can produce a combination of gradient objective information that combines three or more gradient elements. In addition, or alternatively, the training system 102 can combine gradient elements draw from the same class, e.g., by combining two or more pair-based gradient elements.

FIG. 11 shows the accuracy of the nine different combinations shown in FIG. 10 for the case of mapping images to text, and for the case of mapping text to images. Note that the combination of $T^{nca}$ (or $T^{cir}$) and $P^{sig\_ms}$ has superior performance compared to other combinations for the case of mapping images to text. This is insight that is provided by the training system 102 that a developer would likely not independently reach based on conceptual analysis of the problem domain, or ad hoc unstructured experimentation. Further, in some cases, a particular combination may not be capable of being integrated, which would prohibit a developer from discovering it from differentiating a loss function. FIG. 10 is therefore a demonstration of the usefulness of the training system 102 in producing a satisfactory machine-trained model in complex problem domains.

B. Illustrative Processes

FIGS. 12 and 13 show processes that explain the operation of the systems of Section A in flowchart form, according to some implementations. Since the principles underlying the operation of the systems have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In some implementations, the blocks shown in the flowcharts that pertain to processing-related functions are implemented by the hardware logic circuitry described in Section C, which, in turn, can be implemented by one or more hardware processors and/or other logic units that include a task-specific collection of logic gates.

FIG. 12 shows a process 1202 for performing machine learning. In block 1204, the training system 102 receives plural instances of gradient objective information, each of the plural instances of gradient objective information including a particular combination of plural gradient elements, the plural instances of gradient objective information including different respective combinations of gradient elements. In block 1206, the training system 102 produces plural sets of machine-trained parameter values using the plural respective instances of gradient objective information, the operation of producing bypassing calculation of the plural instances of gradient objective information using loss functions. In block 1208, the training system 102 measures performance of the plural sets of machine-trained parameter values in an application system. In block 1210, the training system 102, based on test results generated by the operation of measuring, produces output information that identifies a selected set of machine-trained parameter values from the plural sets of machine-trained parameter values. The selected set offers more effective performance than other of the plural sets of machine-trained parameter values, with respect to any standard of performance (e.g., accuracy, latency, memory utilization, etc., or any combination thereof). The selected set of parameter values is produced using a corresponding selected instance of gradient information having a selected combination of gradient elements. In block 1212, an application system, such as the application system 502 of FIG. 5, uses the set of machine-trained parameter values identified in block 1210 to perform an application task. More specifically, the application system uses the selected set of machine-trained parameter values to produce an output result, the output result having fewer errors compared to output results produced by other considered instances of gradient information having other corresponding combinations of gradient elements.

FIG. 13 shows a process 1302 for producing a first set of machine-trained parameter values for a first instance of gradient objective information. In block 1304, the training system 102 maps a training example that includes at least an anchor item, positive item, and negative item to an embedding space using the neural network 106, to respectively produce at least an anchor-item vector, a positive-item vector, and a negative-item vector, respectively, the positive item matching the anchor item, and the negative item not matching the anchor item. In block 1306, the training system 102 generates similarity information based on at least the anchor-item vector, the positive-item vector, and the negative-item vector. The operations of blocks 1304 and 1306 are to be construed to encompass the case in which the triplet relationship between the anchor item, positive item, and negative item are established prior to the mapping and the generation of similarity information, and the case in which the relationships are established after the mapping and generation of similarity information in online fashion, e.g., by mining a batch of vectors to find a suitable negative vector that meets specified criteria. In block 1308, the training system 102 produces instantiated gradient information based on the similarity information and the first instance of gradient input information, the operation of producing the instantiated gradient information using the first instance of gradient objective information as received and bypassing calculation of the first instance of gradient objective information from a loss function. In block 1310, the training system 102 back-propagates the instantiated gradient information through the neural network 106 and performs optimization, to produce model update information, and uses the model update information to update the first set of machine-trained values. The loop 1312 indicates that the training system 102 repeats the operations of mapping, generating, producing instantiated gradient information, and back-propagating plural times for other training examples, to produce a trained version of the first set of machine-trained parameter values.

C. Representative Computing Functionality

Figure 14:
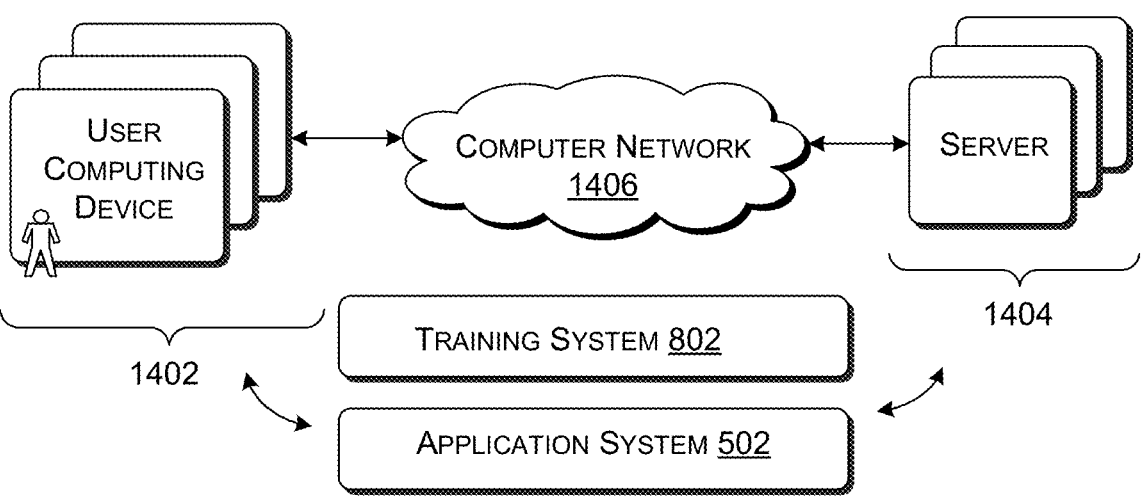
FIG. 14 shows computing equipment that can be used to implement the training system of FIG. 1 and any application system.

FIG. 14 shows an example of computing equipment that can be used to implement any of the systems summarized above. The computing equipment includes a set of user computing devices 1402 coupled to a set of servers 1404 via a computer network 1406. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1406 can be implemented as a local area network, a wide area network (e.g., the Internet), one or more point-to-point links, or any combination thereof.

FIG. 14 also indicates that training system 102 and any application system (e.g., the application system 502 of FIG. 5) can be spread across the user computing devices 1102 and/or the servers 1404 in any manner. For instance, in some cases, the application system 502 is entirely implemented by one or more of the servers 1104. Each user may interact with the servers 1404 via a user computing device. In other cases, the application system 502 is entirely implemented by a user computing device in local fashion, in which case no interaction with the servers 1404 is necessary. In another case, the functionality associated with the application system 502 is distributed between the servers 1404 and each user computing device in any manner.

Figure 15:
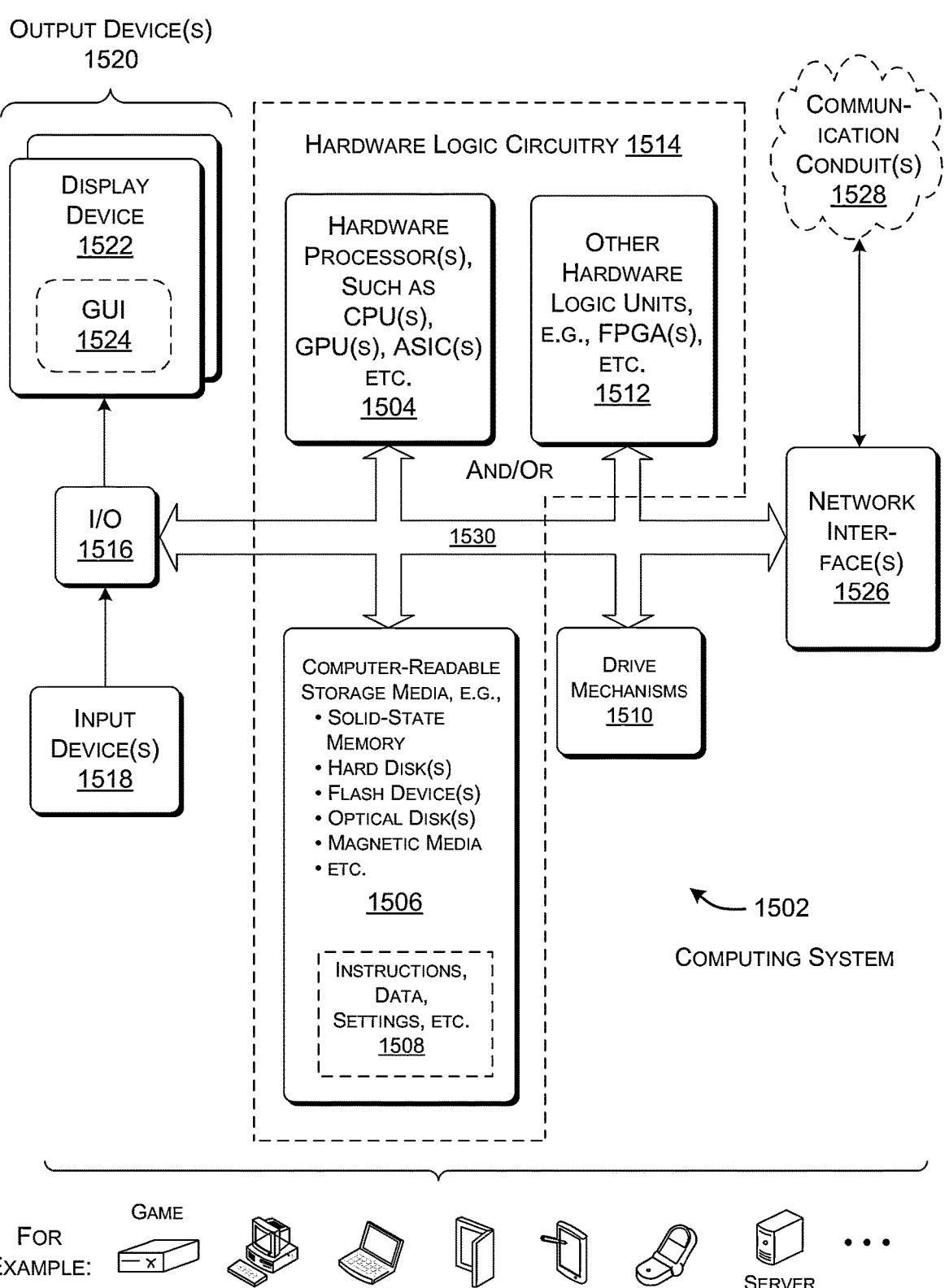
FIG. 15 shows an illustrative type of computing system that can be used to implement any aspect of the features shown in the foregoing drawings.

FIG. 15 shows a computing system 1502 that can be used to implement any aspect of the mechanisms set forth in the above-described figures. For instance, the type of computing system 1502 shown in FIG. 15 can be used to implement any user computing device or any server shown in FIG. 14. In all cases, the computing system 1502 represents a physical and tangible processing mechanism.

The computing system 1502 can include one or more hardware processors 1504. The hardware processor(s) 1504 can include, without limitation, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any hardware processor can correspond to a general-purpose processing unit or an application-specific processor unit.

The computing system 1502 can also include computer-readable storage media 1506, corresponding to one or more computer-readable media hardware units. The computer-readable storage media 1506 retains any kind of information 1508, such as machine-readable instructions, settings, data, etc. Without limitation, the computer-readable storage media 1506 can include one or more solid-state devices, one or more magnetic hard disks, one or more optical disks, magnetic tape, and so on. Any instance of the computer-readable storage media 1506 can use any technology for storing and retrieving information. Further, any instance of the computer-readable storage media 1506 can represent a fixed or removable unit of the computing system 1502. Further, any instance of the computer-readable storage media 1506 can provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing system 1502 can utilize any instance of the computer-readable storage media 1506 in different ways. For example, any instance of the computer-readable storage media 1506 may represent a hardware memory unit (such as Random Access Memory (RAM)) for storing information during execution of a program by the computing system 1502, and/or a hardware storage unit (such as a hard disk) for retaining/archiving information on a more permanent basis. In the latter case, the computing system 1502 also includes one or more drive mechanisms 1510 (such as a hard drive mechanism) for storing and retrieving information from an instance of the computer-readable storage media 1506.

The computing system 1502 can perform any of the functions described above when the hardware processor(s) 1504 carry out computer-readable instructions stored in any instance of the computer-readable storage media 1506. For instance, the computing system 1502 can carry out computer-readable instructions to perform each block of the processes described in Section B.

Alternatively, or in addition, the computing system 1502 can rely on one or more other hardware logic units 1512 to perform operations using a task-specific collection of logic gates. For instance, the hardware logic unit(s) 1512 can include a fixed configuration of hardware logic gates, e.g., that are created and set at the time of manufacture, and thereafter unalterable. Alternatively, or in addition, the other hardware logic unit(s) 1512 can include a collection of programmable hardware logic gates that can be set to perform different application-specific tasks. The latter class of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 15 generally indicates that hardware logic circuitry 1514 includes any combination of the hardware processor(s) 1504, the computer-readable storage media 1506, and/or the other hardware logic unit(s) 1512. That is, the computing system 1502 can employ any combination of the hardware processor(s) 1504 that execute machine-readable instructions provided in the computer-readable storage media 1506, and/or one or more other hardware logic unit(s) 1512 that perform operations using a fixed and/or programmable collection of hardware logic gates. More generally stated, the hardware logic circuitry 1514 corresponds to one or more hardware logic units of any type(s) that perform operations based on logic stored in and/or otherwise embodied in the hardware logic unit(s). Further, in some contexts, each of the terms "component," "module," "engine," "system," and "tool" refers to a part of the hardware logic circuitry 1514 that performs a particular function or combination of functions.

In some cases (e.g., in the case in which the computing system 1502 represents a user computing device), the computing system 1502 also includes an input/output interface 1516 for receiving various inputs (via input devices 1518), and for providing various outputs (via output devices 1520). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism can include a display device 1522 and an associated graphical user interface presentation (GUI) 1524. The display device 1522 can correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 1502 can also include one or more network interfaces 1526 for exchanging data with other devices via one or more communication conduits 1528. One or more communication buses 1530 communicatively couple the above-described units together.

The communication conduit(s) 1528 can be implemented in any manner, e.g., by a local area computer network, a wide area computer network (e.g., the Internet), point-to-point connections, etc., or any combination thereof. The communication conduit(s) 1528 can include any combination of hardwired links, wireless links, routers, gateway functionality, name servers, etc., governed by any protocol or combination of protocols.

FIG. 15 shows the computing system 1502 as being composed of a discrete collection of separate units. In some cases, the collection of units corresponds to discrete hardware units provided in a computing device chassis having any form factor. FIG. 15 shows illustrative form factors in its bottom portion. In other cases, the computing system 1502 can include a hardware logic unit that integrates the functions of two or more of the units shown in FIG. 1. For instance, the computing system 1502 can include a system on a chip (SoC or SOC), corresponding to an integrated circuit that combines the functions of two or more of the units shown in FIG. 15.

The following summary provides a non-exhaustive set of illustrative examples of the technology set forth herein.

(A1) According to a first aspect, some implementations of the technology described herein include a computer-implemented method (e.g., the process 1202) for performing machine learning. The method includes receiving (e.g., in block 1204) plural instances of gradient objective information, each of the plural instances of gradient objective information including a particular combination of plural gradient elements, the plural instances of gradient objective information including different respective combinations of gradient elements. The method further includes: producing (e.g., in block 1206) plural sets of machine-trained parameter values using the plural respective instances of gradient objective information, the operation of producing bypassing calculation of the plural instances of gradient objective information using loss functions; measuring (e.g., in block 1208) performance of the plural sets of machine-trained parameter values in an application system (e.g., the application system 502); and based on test results generated by the measuring, producing (e.g., in block 1210) output information that identifies a selected set of machine-trained parameter values from the plural sets of machine-trained parameter values that most effectively satisfies a specified standard of performance, the selected set of parameter values being produced using a corresponding selected instance of gradient information having a selected combination of gradient elements. The application system uses the selected set of machine-trained parameter values to produce an output result, the output result having fewer errors compared to output results produced by other considered instances of gradient information having other corresponding combinations of gradient elements. The method is advantageous because it provides a time-efficient and resource-efficient way of developing a machine-trained model. The method also can enable the application system to produce output results having a reduced number of errors, compared to application systems having models training using other techniques.

(A2) According to some implementations of the method of A1, a particular instance of gradient objective information of the plural instances of gradient objective information includes: a first gradient element that is part of a gradient of a first loss function; and a second gradient element that is part of a gradient of a second loss function, the second loss function being different than the first loss function.

(A3) According to some implementations of any of the methods of A1 or A2, a particular instance of gradient objective information of the plural instances of gradient objective information includes: a first pair-based gradient element that is based on similarity information that depends on comparison of two input items of a triplet; and a second triplet-based gradient element that is based on similarity information that depends on comparison of three input items of the triplet.

(A4) According to some implementations of any of the methods of A1-A3, a first set of machine-trained parameter values is produced for a first instance of gradient objective information, of the plural instances of gradient objective information, by: mapping a training example that includes at least an anchor item, positive item, and negative item to an embedding space using a neural network, to respectively produce at least an anchor-item vector, a positive-item vector, and a negative-item vector, respectively; generating similarity information based on at least the anchor-item vector, the positive-item vector, and the negative-item vector, a triplet relationship between the anchor item, positive item, and negative item being established prior to the operation of generating of similarity information, or after the operation of generating of similarity information; producing instantiated gradient information based on the similarity information and the first instance of gradient input information, the operation of producing the instantiated gradient information using the first instance of gradient objective information as received and bypassing calculation of the first instance of gradient objective information from a loss function; back-propagating the instantiated gradient information through the neural network and performing optimization, to produce model update information, and using the model update information to update the first set of machine-trained values; and repeating the operations of mapping, generating, producing instantiated gradient information, and back-propagating plural times for other training examples.

(A5) According to some implementations of the method of A4, the training example includes at least one image.

(A6) According to some implementations of the method of A5, the training example also includes at least at least one text item.

(A7) According to some implementations of any of the methods of A4-A6, the neural network includes a first neural network for mapping the anchor item into the anchor-item vector, and a second neural network for mapping the positive item and the negative item into the positive-item vector and negative-item vector, respectively.

(A8) According to some implementations of the method of A7, the first neural network processes images and the second neural network processes text items.

(A9) According to some implementations of any of the methods of A7 or A8, the first neural network and/or the second neural network has a transformer-based architecture.

(A10) According to some implementations of any of the methods of A7 or A8, the first neural network and/or the second neural network has a convolutional neural network architecture.

(A11) According to some implementations of any of the methods of A1-A10, the application system is a search application that identifies a target item that matches an input query.

(A12) According to some implementations of any of the methods of A1-A11, the application system performs a control action based on output results produced by the selected set of parameter values.

(B1) According to a second aspect, other implementations of the technology described herein include a computing system (e.g., the computing system 1502) having a computer-implemented application system (e.g., the application system 502) that performs an application task based on a machine-trained model (e.g., the trained model 506), the machine-trained model using a selected set of machine-trained parameter values produced by a computer-implemented training system (e.g., the training system 102). The selected set of parameter values is produced by the training system, using hardware logic circuitry (e.g., the hardware logic circuitry 1514) provided by the training system, by: receiving (e.g., in block 1204) plural instances of gradient objective information, each of the plural instances of gradient objective information including a particular combination of plural gradient elements, the plural instances of gradient objective information including different respective combinations of gradient elements; producing (e.g., in block 1206) plural sets of machine-trained parameter values using the plural respective instances of gradient objective information, the operation of producing bypassing calculation of the plural instances of gradient objective information using loss functions; measuring (e.g., in block 1208) performance of the plural sets of machine-trained parameter values in the application system; and based on test results generated by the operation of measuring, producing (e.g., in block 1210) output information that identifies the selected set of machine-trained parameter values from the plural sets of machine-trained parameter values that most effectively satisfies a specified standard of performance, the selected set of parameter values being produced using a corresponding selected instance of gradient information having a selected combination of gradient elements. The application system uses the selected set of machine-trained parameter values to produce an output result, the output result having fewer errors compared to output results produced by other considered instances of gradient information having other corresponding combinations of gradient elements.

In yet another aspect, some implementations of the technology described herein include another computing system (e.g., the computing system 1502). The computing system includes hardware logic circuitry (e.g., the hardware logic circuitry 1514) that is configured to perform any of the methods described herein (e.g., any of the methods of A1-A12).

In yet another aspect, some implementations of the technology described herein include a computer-readable storage medium (e.g., the computer-readable storage media 1506) for storing computer-readable instructions (e.g., the instructions 1508). One or more hardware processors (e.g., the hardware processors 1504) execute the computer-readable instructions to perform any of the methods described herein (e.g., any of the methods of A1-A12).

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuity 1514 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional," or may have used other language to indicate that one or more feature may be used in some implementations, but not other implementations. This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are openended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for performing machine learning to produce parameters values of a neural network, comprising:

receiving plural instances of gradient objective information, each of the plural instances of gradient objective information including a particular combination of plural gradient elements selected from a data store of gradient elements, the plural instances of gradient objective information including different respective combinations of gradient elements;

producing plural sets of machine-trained parameter values of the neural network using the plural respective instances of gradient objective information, said producing being performed without calculation of the plural instances of gradient objective information using loss functions during training, the producing performing training on training examples in successive forward and backward passes to produce each set of machine-trained parameters of the neural network, the producing performing each backward pass by back-propagating an instance of instantiated gradient information backward through levels of the neural network;

measuring performance of the plural sets of machine-trained parameter values in an application system; and based on test results generated by said measuring, producing output information that identifies a selected set of machine-trained parameter values from the plural sets of machine-trained parameter values that most effectively satisfies a specified standard of performance, the selected set of parameter values being produced using a corresponding selected instance of gradient information having a selected combination of gradient elements, the application system using the selected set of machine-trained parameter values to produce an output result, the output result having fewer errors compared to output results produced by other considered instances of gradient information having other corresponding combinations of gradient elements.

2. The computer-implemented method of claim 1, wherein a particular instance of gradient objective information of the plural instances of gradient objective information includes:

a first gradient element that is part of a gradient of a first loss function; and a second gradient element that is part of a gradient of a second loss function, the second loss function being different than the first loss function, the first loss function and the second loss function being deep metric learning (DML) loss functions.

3. The computer-implemented method of claim 1, wherein a particular instance of gradient objective information of the plural instances of gradient objective information includes:

a first pair-based gradient element that is based on similarity information that depends on comparison of two input items of a triplet, including an anchor item, and a positive item or a negative item; and a second triplet-based gradient element that is based on similarity information that depends on comparison of three input items of the triplet, including the anchor item and the positive item, or the anchor item and the negative item.

4. The computer-implemented method of claim 1, wherein a first set of machine-trained parameter values is produced for a first instance of gradient objective information, of the plural instances of gradient objective information, by:

mapping a training example that includes at least an anchor item, positive item, and negative item to an embedding space using the neural network, to respectively produce at least an anchor-item vector, a positive-item vector, and a negative-item vector, respectively;

generating similarity information based on at least the anchor-item vector, the positive-item vector, and the negative-item vector, a triplet relationship between the anchor item, positive item, and negative item being established prior to said generating of similarity information, or after said generating of similarity information;

producing instantiated gradient information based on the similarity information and the first instance of gradient input information, said producing the instantiated gradient information using the first instance of gradient objective information as received without calculation of the first instance of gradient objective information from a loss function during training;

back-propagating the instantiated gradient information through the neural network and performing optimization, to produce model update information, and using the model update information to update the first set of machine-trained values; and repeating said mapping, generating, producing instantiated gradient information, and back-propagating plural times for other training examples.

5. The computer-implemented method of claim 4, wherein the training example includes at least one image.

6. The computer-implemented method of claim 5, wherein the training example also includes at least at least one text item.

7. The computer-implemented method of claim 4, wherein the neural network includes a first neural network for mapping the anchor item into the anchor-item vector, and a second neural network for mapping the positive item and the negative item into the positive-item vector and negative-item vector, respectively.

8. The computer-implemented method of claim 7, wherein the first neural network processes images and the second neural network processes text items.

9. The computer-implemented method of claim 7, wherein the first neural network and/or the second neural network has a transformer-based architecture.

10. The computer-implemented method of claim 7, wherein the first neural network and/or the second neural network has a convolutional neural network architecture.

11. The computer-implemented method of claim 1, wherein the application system is a search application that identifies a target item that matches an input query.

12. The computer-implemented method of claim 1, wherein the application system performs a control action based on output results produced by the selected set of parameter values.

13. A computing system, comprising:

a computer-implemented application system, including a hardware processor, that performs an application task based on a neural network, neural network using a selected set of machine-trained parameter values produced by a computer-implemented training system, the training system also including a hardware processor, the selected set of parameter values being produced by the training system, using the hardware processor provided by the training system, by:

receiving plural instances of gradient objective information, each of the plural instances of gradient objective information including a particular combination of plural gradient elements selected from a data store of gradient elements, the plural instances of gradient objective information including different respective combinations of gradient elements;

producing plural sets of machine-trained parameter values using the plural respective instances of gradient objective information, said producing being performed without calculation of the plural instances of gradient objective information using loss functions during training, the producing performing training on training examples in successive forward and backward passes to produce each set of machine-trained parameters of the neural network, the producing performing each backward pass by back-propagating an instance of instantiated gradient information backward through levels of the neural network;

measuring performance of the plural sets of machine-trained parameter values in the application system; and based on test results generated by said measuring, producing output information that identifies the selected set of machine-trained parameter values from the plural sets of machine-trained parameter values that most effectively satisfies a specified standard of performance, the selected set of parameter values being produced using a corresponding selected instance of gradient information having a selected combination of gradient elements, the application system using the selected set of machine-trained parameter values to produce an output result, the output result having fewer errors compared to output results produced by other considered instances of gradient information having other corresponding combinations of gradient elements.

14. The computing system of claim 13, wherein a particular instance of gradient objective information of the plural instances of gradient objective information includes:

a first gradient element that is part of a gradient of a first loss function; and a second gradient element that is part of a gradient of a second loss function, the second loss function being different than the first loss function.

15. The computing system of claim 13, wherein a first set of machine-trained parameter values is produced for a first instance of gradient objective information, of the plural instances of gradient objective information, by:

mapping a training example that includes at least an anchor item, positive item, and negative item to an embedding space using the neural network, to respectively produce at least an anchor-item vector, a positive-item vector, and a negative-item vector, respectively, the positive item matching the anchor item, and the negative item not matching the anchor item;

generating similarity information based on at least the anchor-item vector, the positive-item vector, and the negative-item vector, a triplet relationship between the anchor item, positive item, and negative item being established prior to said generating of similarity information, or after said generating of similarity information;

producing instantiated gradient information based on the similarity information and the first instance of gradient input information, said producing instantiated gradient information using the first instance of gradient objective information as received and without calculation of the first instance of gradient objective information from a loss function during training;

back-propagating the instantiated gradient information through the neural network and performing optimization, to produce model update information, and using the model update information to update the first set of machine-trained values; and repeating said mapping, generating, producing instantiated gradient information, and back-propagating plural times for other training examples.

16. The computing system of claim 15, wherein the neural network includes a first neural network for mapping the anchor item into the anchor-item vector, and a second neural network for mapping the positive item and the negative item into the positive-item vector and negative-item vector, respectively.

17. The computing system of claim 16, wherein the first neural network processes images and the second neural network processes text items.

18. The computing system of claim 13, wherein the application task performed by the application system is a search application that identifies a target item that matches an input query.

19. A computer-readable storage medium for storing computer-readable instructions, one or more hardware processors executing the computer-readable instructions to perform a method that comprises:

receiving plural instances of gradient objective information, each of the plural instances of gradient objective information including a particular combination of plural gradient elements selected from a data store of gradient elements, the plural instances of gradient objective information including different respective combinations of gradient elements; and producing plural sets of machine-trained parameter values of a neural network using the plural respective instances of gradient objective information, said producing being performed without calculation of the plural instances of gradient objective information using loss functions during training, the producing performing training on training examples in successive forward and backward passes to produce each set of machine-trained parameters of the neural network, the producing performing each backward pass by back-propagating an instance of instantiated gradient information backward through levels of the neural network;

said producing including, for a first instance of gradient objective information, of the plural instances of gradient objective information:

mapping a training example that includes at least an anchor item, positive item, and negative item to a vector space using a neural network, to respectively produce at least an anchor-item vector, a positive-item vector, and a negative-item vector, respectively, the positive item matching the anchor item, and the negative item not matching the anchor item;

generating similarity information based on at least the anchor-item vector, the positive-item vector, and the negative-item vector, a triplet relationship between the anchor item, positive item, and negative item being established prior to said generating of similarity information, or after said generating of similarity information;

producing instantiated gradient information based on the similarity information and the first instance of gradient input information, said producing instantiated gradient information using the first instance of gradient objective information as received and without calculation of the first instance of gradient objective information from a loss function during training;

back-propagating the instantiated gradient information through the neural network and performing optimization, to produce model update information, and using the model update information to update the first set of machine-trained values; and repeating said mapping, generating, producing the instantiated gradient information, and back-propagating plural times for other training examples.

20. The computer-readable storage medium of claim 19, wherein the training example includes at least one image and at least one text item.

* * * * *